(12) United States Patent
Kamura et al.

(10) Patent No.: US 7,680,081 B2
(45) Date of Patent: Mar. 16, 2010

(54) MOBILE NODE

(75) Inventors: Takeshi Kamura, Kawasaki (JP);
Naotaka Tsuji, Yokohama (JP);
Yoshiyuki Seguchi, Yokohama (JP);
Kazuhiro Muraoka, Yokohama (JP);
Hidetoshi Abeta, Yokohama (JP);
Hiraku Koganemaru, Yokohama (JP);
Zenichi Yashiro, Kawasaki (JP); Hitoshi Koike, Kawasaki (JP); Nobutsugu Fujino, Kawasaki (JP); Fumiyuki Iizuka, Kawasaki (JP); Itaru Nakagawa, Kawasaki (JP); Keiichi Nakatsugawa, Kawasaki (JP);
Masahiko Fuse, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 1341 days.

(21) Appl. No.: 11/106,269

(22) Filed: Apr. 14, 2005

(65) Prior Publication Data

US 2005/0176432 A1    Aug. 11, 2005

Related U.S. Application Data

(63) Continuation of application No. PCT/JP02/13331, filed on Dec. 19, 2002.

(51) Int. Cl.
*H04W 4/00* (2009.01)
*H04W 72/00* (2009.01)
*H04W 36/00* (2009.01)
(52) U.S. Cl. .................. 370/332; 370/331; 370/328; 370/338; 455/453; 455/437; 455/444; 455/452.2
(58) Field of Classification Search .............. 455/437, 455/442, 443, 444, 448, 452.2, 453; 370/331, 370/332, 333, 328, 338
See application file for complete search history.

(56) References Cited

U.S. PATENT DOCUMENTS 6,233,454 B1    5/2001    Sato (Continued)

FOREIGN PATENT DOCUMENTS

EP    0 837 617    4/1998

(Continued)

OTHER PUBLICATIONS

International Search Report dated Apr. 22, 2003.

(Continued)

*Primary Examiner*—Un C Cho
(74) *Attorney, Agent, or Firm*—Katten Muchin Rosenman LLP

(57) ABSTRACT

A mobile node is arranged to perform a high-quality handover operation for eliminating an interruption time in communication and keeping the continuance of communication excellent. The mobile node has a function of interfacing with networks and includes a network quality monitor, a hand-over controller, and a network controller. The network quality monitor operates to monitor a network quality based on at least one of an intensity and a radio bandwidth of a radio wave received by network devices. The hand-over controller performs the hand-over operation of transmitting a care of address to an address registering destination in response to a state of the network quality before a communication is disconnected, changing a route of communication information, and switching a connecting destination into a new network. The network controller receives a response that indicates an update of the care of address in the address registering destination and keeping a function of receiving data from the network before being switched until the communication is disconnected.

26 Claims, 19 Drawing Sheets

U.S. PATENT DOCUMENTS

| | | |
|---|---|---|
| 7,480,307 B2 * | 1/2009 | Chaskar et al. ............ 370/401 |
| 2001/0009853 A1 | 7/2001 | Arimitsu |
| 2002/0045450 A1 | 4/2002 | Shimizu et al. |
| 2003/0095523 A1 * | 5/2003 | Korus et al. ................. 370/338 |

FOREIGN PATENT DOCUMENTS

| | | |
|---|---|---|
| EP | 1 199 841 | 4/2002 |
| JP | 5-41689 | 2/1993 |
| JP | 5-91038 | 4/1993 |
| JP | 6-45990 | 2/1994 |
| JP | 8-294158 | 11/1996 |
| JP | 10-126830 | 5/1998 |
| JP | 2000-050337 | 2/2000 |
| JP | 2000--115236 | 4/2000 |
| JP | 2000-251658 | 9/2000 |
| JP | 2001-197538 | 7/2001 |
| JP | 2001-258058 | 9/2001 |
| JP | 2002-125254 | 4/2002 |

OTHER PUBLICATIONS

Japanese Office Action dated Mar. 4, 2008, with partial translation, from the corresponding Japanese Application.

Full Translation of a Japanese Office Action (Notification of Reason(s) for Refusal) issued Mar. 4, 2008, from the corresponding Japanese Application.

Japanese Office Action issued on Sep. 30, 2008, from the corresponding Japanese Application.

* cited by examiner

MOBILE NODE

CROSS-REFERENCE TO RELATED APPLICATION

This application is a continuing application, filed under 35 U.S.C. §111(a), of International Application PCT/JP2002/013331, filed Dec. 19, 2002, currently pending, the contents of which are herein wholly incorporated by reference.

BACKGROUND OF THE INVENTION

1. Field of the Invention

The present invention relates to a mobile node, and more particularly to a mobile node for performing communications on a mobile IP (Internet Protocol) network.

2. Description of the Related Art

With recent advance of the multimedia, a request for an information network is growing sophisticated and variable. In order to meet the request, development of the information network is also growing more rapidly for the purpose of realizing a ubiquitous network society. (The work "ubiquitous" means being or seeming to be everywhere at the same time in the Latin language.) The ubiquitous network is remarked as the next stage of the computerization society. This network is oriented to the ubiquitous computing environment where any computer may be used everywhere at any time.

What is significant to the ubiquitous environment is that a user can connect to the network at any time. Hence, a request has risen for realizing wireless communications with no limitation caused by cable connection. In order to meet the request, today, a mobile node is growing more multifunctional so that a user can connect to a plurality of networks (mobile IP networks) through one mobile node by various kinds of methods.

On the other hand, a key to prevailing the mobile IP is a hand-over technology. The hand-over is a technology of automatically switching a connecting destination of the current network with which a mobile node is communicating to another destination so that if the mobile node is moved to another network, the communication is kept stable.

For example, in a case that a person who listens to a music tune with a PDA (Personal Digital Assistants) provided with a wireless LAN (Local Area Network) is removed from a coffee shop to a boutique located adjacent to the coffee shop (assuming that the PDA and the wireless LAN are matched to the mobile IP), provision of the hand-over function allows the user to listen to the music tune streamingly even if the user moves to another place. This type of hand-over control needs so instant an execution that the user is unconscious of the hand-over. This instant hand-over control is quite important to data communications rather than speech communications.

The description will be oriented to the conventional hand-over technology. In the case of detecting a disconnection of a currently connected network, the conventional hand-over operation is executed to automatically select a predetermined user's policy and a network to be used for the user's policy when switching one network to another. Further, there has also been proposed a technology of measuring an electric field intensity of a received signal, determining the use of a current station in a weak electric field intensity if the measured result is equal to or less than a reference value, and handing the connection over to another station. For example, refer to the Official Gazette of the Japanese Unexamined Patent Publication No. 2000-50337 (paragraph numbers [0005] to [0010] and FIG. 2).

In the foregoing prior arts, however, the former art is arranged to execute the hand-over operation after detecting a disconnection of a currently connected network. It means the communication is interrupted from the disconnection to the completion of switching the current network to another network. Hence, if the switch from one network to another is executed while packets are being received, disadvantageously, a packet loss takes place. For example, while a user enjoys a streaming broadcast, a streaming image or speech is interrupted. If packets of streaming data reach the user's equipment during the interruption, such a packet loss takes place.

On the other hand, the latter prior art (Japanese Unexamined Patent Publication No. 2000-50337) is arranged to execute the hand-over operation not after disconnection of the currently connected network but when the electric field intensity of the received signal is equal to or less than the reference value. No consideration is taken of a process for registering a mobile node when the network is switched. Disadvantageously, therefore, the communication may not be restarted after the hand-over operation.

That is, if the registration process of a mobile IP required when switching the network is not completed on the network side, no communication may be started properly in a new destination network. Hence, the mobile node is required to allow the packets passed through the previous network before being moved to be received for a given length of time even after the hand-over operation.

Further, in some cases, the wireless network may be disconnected once a connection is established (for example, closer to a border between the radio wave receiving areas). For preventing unsmoothness in connecting one network with another, therefore, what is further important is that the hand-over operation is executed after a destination network becomes stable.

SUMMARY OF THE INVENTION

In view of the foregoing, it is an object of the present invention to provide a mobile node which is arranged to execute a high-quality hand-over operation for completely preventing interruption of the current communication and keeping the communications well-continued.

To accomplish the above object, the present invention provides a mobile node having a capability of performing communication on an mobile IP (Internet Protocol) network. The mobile node includes a plurality of network devices each of which provides a function of interfacing with a network, a network quality monitor for monitoring a network quality based on at least one of a radio field intensity and a radio bandwidth of each of those network devices, a hand-over controller for transmitting a care of address to an address registering destination before the communication is disconnected according to the state of the network quality, changing a route of information being communicated, and switching a connecting destination to a new network, and a network controller for receiving a response that indicates the care of address is updated in the address registering destination and keeping receipt of radio waves from the previous network before being switched until the communication is disconnected.

The above and the other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
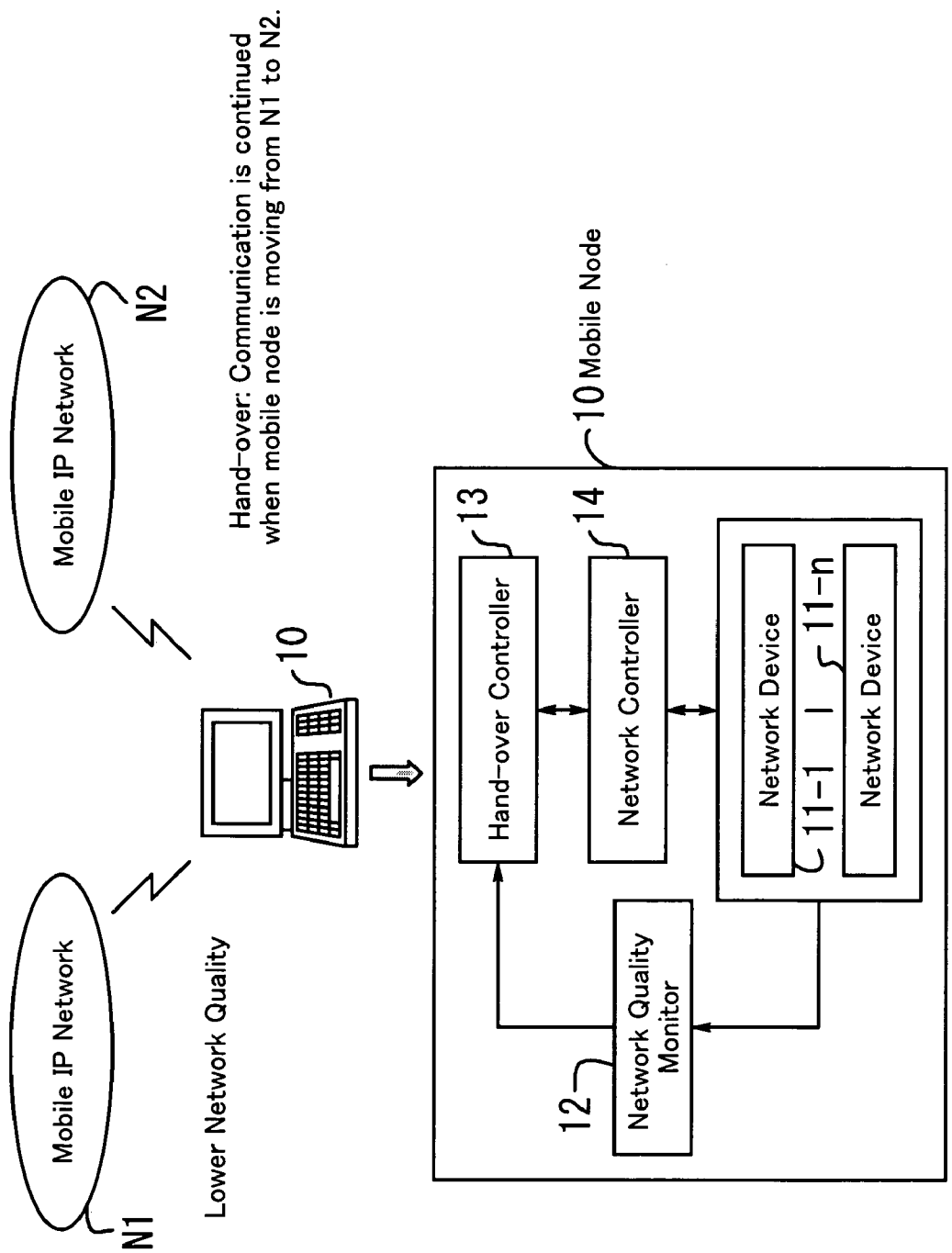
FIG. 1 is a view of principle showing a mobile node according to the present invention.

Hereafter, the embodiments of the present invention will be described with reference to the appended drawings. FIG. 1 is a view of principle showing the mobile node according to the present invention. A mobile node 10 is a terminal that executes communications on a mobile IP network. It corresponds to a notesized personal computer, a PDA or a portable phone. The function of the present invention may be applied to any one of a mobile IP v4 and a mobile IP v6.

Each of the network devices 11-1 to 11-$n$ has a function of interfacing with a network. For example, each network device corresponds to a network interface card (NIC). The mobile node 10 includes a plurality of network devices for connecting networks such as a wireless LAN and a three-generation portable phone network, the FOMA (registered trademark, omitted below) so that one mobile node terminal may connect with a plurality of networks.

A network quality monitor 12 monitors a network quality, based on at least one of the intensity and the radio bandwidth of the radio wave received by each of the network devices 11-1 to 11-$n$. A hand-over controller 13 performs a hand-over operation of transmitting a care of address (CoA) to an address registering destination (such as a home agent) before the communication is disconnected, changing a route of information being communicated (IP packets), and switching a connecting destination from one network to another one. As a switch of connection between the networks, the switch of connection is executed from a mobile IP network being currently active in communication to a new mobile IP network.

In addition, the care of address means an IP address the mobile node 10 temporarily uses in the newly switched network. The home agent means a node located in a home network of the mobile node 10 and for delivering information destined for the mobile node 10 and recognizing where the mobile node 10 is located.

In selecting the destination network, the hand-over controller 13 stores a user priority (priority sequence of connecting the networks) to be set by a user and hands the connection over to the network of a higher priority according to the change of a network quality. Alternatively, the hand-over controller 13 performs the hand-over operation based on the network quality index managed by a network quality monitor 12 to be discussed below. The network controller 14 receives a response that indicates the care of address is updated in the address registering destination and keeps the function of receiving packets from the previous network before being switched until the communication with the previous network is cut off.

In FIG. 1, at first, consider that when the mobile node 10 is communicating with the network N1, the mobile node 10 is moved to the network N2. In the present invention, when the mobile node 10 recognizes the network quality of the network N1 becomes lower, the mobile node 10 performs the hand-over operation. (That is, if the mobile node 10 recognizes the network quality becomes lower before the network is disconnected from the mobile node, the mobile node 10 performs the hand-over operation.) The hand-over operation allows the mobile node 10 to connect with the network N2 for continuing the communication. At this time, until the communication with the network N1 before being switched is cut off, the mobile node 10 keeps the packets received from the network N1. This makes it possible to carry out a hand-over operation with no packet loss caused (no interruption time in communication).

Figure 2:
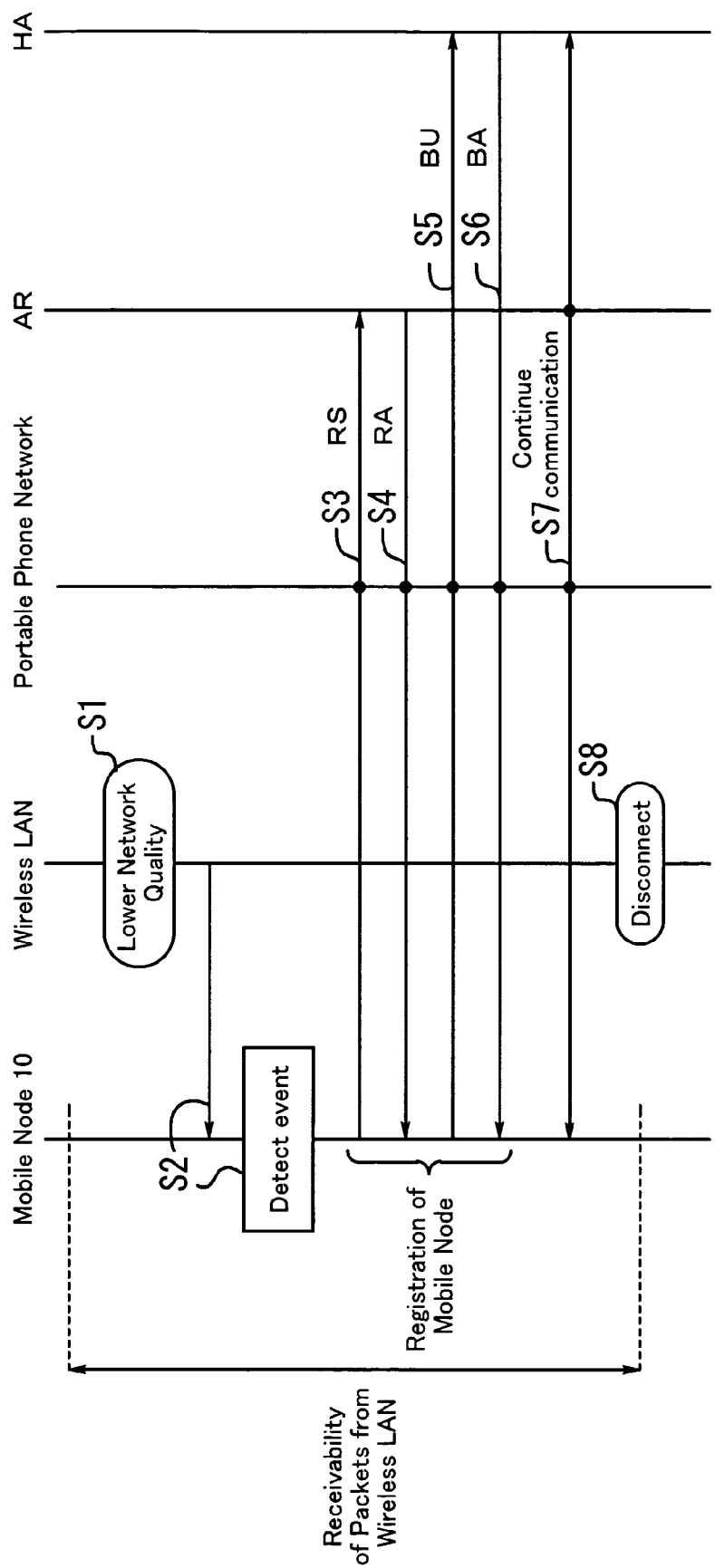
FIG. 2 is a sequence view showing an operation of the mobile node.

In turn, the overall operation of the mobile node 10 will be described with reference to the sequence view. FIG. 2 is a sequence view showing the operation of the mobile node 10. At first, when the mobile node 10 performs a communication through a wireless LAN, then, the mobile node 10 moves to a portable phone network (such as the FOMA), through which the mobile node 10 performs communications.

[S1] When the mobile node 10 performs a communication through the wireless LAN, the mobile node 10 moves to the portable phone network, that is, the mobile node 10 is gradually far away from the wireless LAN. This results in lowering the network quality of the wireless LAN. The change of the state of the network quality is detected by the mobile node 10 irrespective of the movement of the mobile node 10.

[S2] The mobile node 10 detects an even that indicates the network quality of the wireless LAN being currently active in communication. Then, the mobile node 10 starts the hand-over operation.

[S3] The mobile node 10 transmits a router solicitation (RS) to an access router through the portable phone network. The RS means a request for obtaining pre-fix information (which is an upper 64-bit network identifier of an IPv6 address consisting of 128 bits if the information concerns with the IPv6). The access router is a router which performs traffic routing between the IP network and the portable phone network.

[S4] The access router gives back a router advertisement (RA) (meaning Notice of Prefix Information) to the mobile node 10 through the portable phone network.

[S5] The mobile node 10 transmits a binding update (BU) (meaning Request for registering the care of address) to the home agent through the portable phone network.

[S6] The home agent gives back a binding acknowledgement (BA) (meaning Response for registering a care of address) to the mobile node 10 through the portable phone network.

[S7] The mobile node 10 continues the communication with the wireless LAN through the portable phone network, the access router, and the home agent.

[S8] The communication between the mobile node 10 and the wireless LAN is cut off. From the lower network quality at the step S1 to the disconnection at the step S8, the mobile node 10 continues the receipt of the packets from the wireless LAN.

Figure 3:
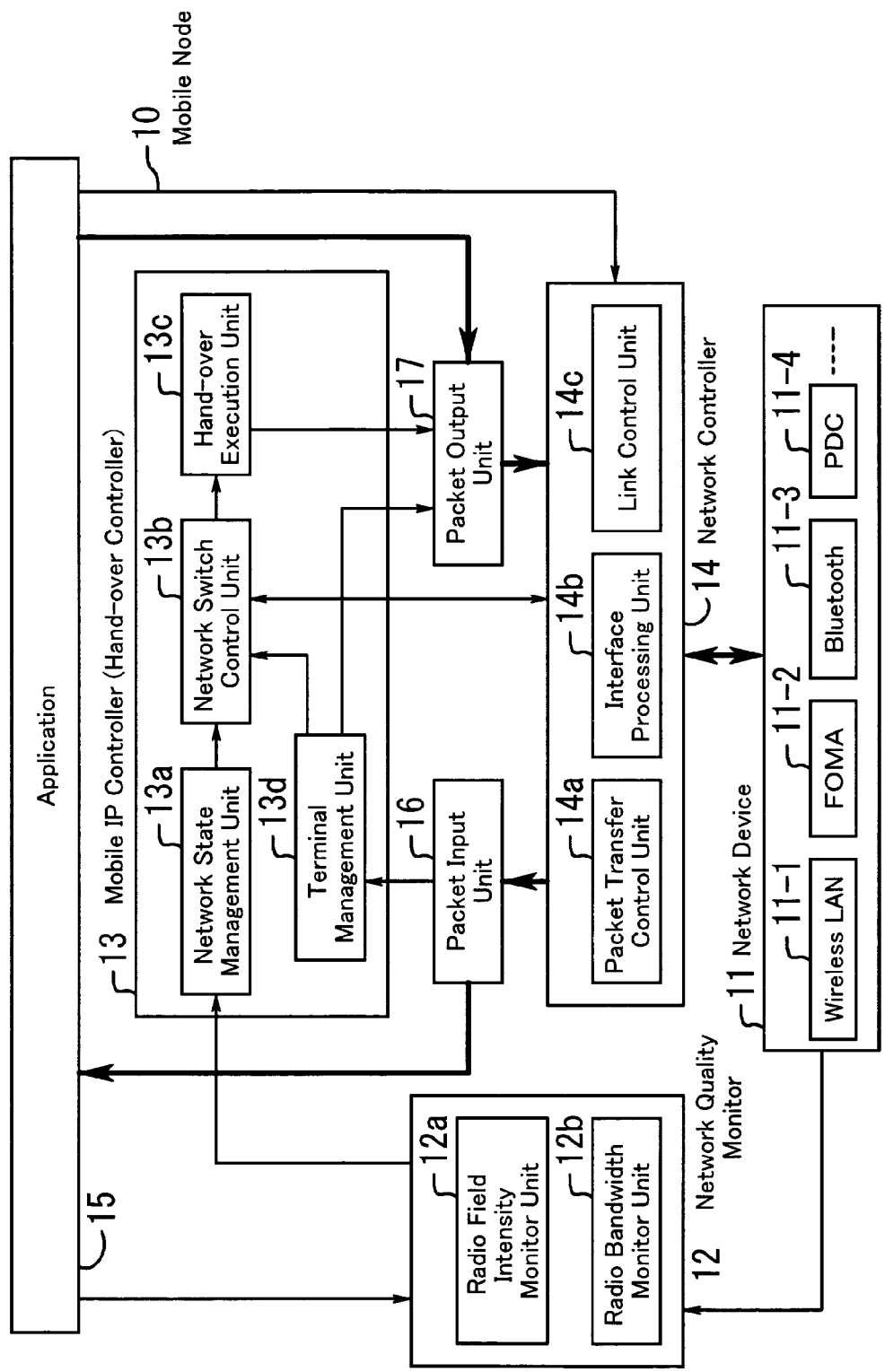
FIG. 3 is a block diagram showing an arrangement of the mobile node.

In turn, the description will be oriented to the configuration of the mobile node 10. FIG. 3 shows the configuration of the mobile node 10. In FIG. 3, an arrow written in a thick real line indicates data, while an arrow written in a thin real line indicates a control signal. The mobile node 10 includes a network device 11, a network quality monitor 12, a mobile IP controller (that corresponds to the hand-over controller of the present invention) 13, a network controller 14, an application 15, a packet input unit 16, and a packet output unit 17.

The application 15 is an upward application that executes communications with another node or supplies a user with services. This application 15 includes applications that execute a process of stopping (down) a communication interface with the network device 11 and a process of cutting off a call-up link of a phone. This application 15 is executed to request the network controller 14 of the interface-down process or the link cutting process in response to an instruction given by a user.

The mobile IP controller 13 includes a network state management unit 13*a*, a network switch control unit 13*b*, a hand-over execution unit 13*c*, and a terminal management unit 13*d*. The mobile IP controller 13 manages the overall mobile node 10 or controls the hand-over operation.

When the network state management unit 13*a* receives a network quality change event from the network quality monitor 12, the network state management unit 13*a* notifies the network switch control unit 13*b* of a request for switching a network based on the quality state. The network switch control unit 13*b* outputs a hand-over request to the hand-over execution unit 13*c* according to the change of the network quality (for example, lower or recovery of a radio field intensity, short or recovery of a radio bandwidth, or cut-off or establishment of a network connection) in response to a request for switching a network. Further, the control unit 13*b* outputs an indication for switching a network to the network controller 14. The hand-over execution unit 13*c* executes the hand-over operation of the mobile IP in response to the hand-over request. The terminal management unit 13*d* manages information of the mobile node, controls the communication of the mobile node 10, and outputs a request for switching a network if necessary to the network switch control unit 13*b*. Further, the request for outputting packet data is transmitted to the packet output unit 17.

The packet input unit 16 is inputted with packet data received through the network device 11. The packet output unit 17 transmits the packet data to the concerned network through the network device 11 in response to the request for outputting the packet data.

The network controller 14 includes a packet transfer control unit 14*a*, an interface processing unit 14*b*, and a link control unit 14*c*. The network controller 14 manages the network device 11 and manages the whole transfer of packets.

The packet transfer control unit 14*a* controls the sending and receiving of packets. When switching the network, the control unit 14*a* sends and receives the packets to and from a newly switched network as keeping the function of receiving packets from the previous network before being switched.

The interface processing unit 14*b* manages and controls the state of a packet I/O interface of the network device 11. If the interface is stopped down in response to a request given from the application 15, when the communication interface of the target network device is being currently used, the network switching is executed in the network switch control unit 13*b*, the hand-over operation is executed as well, and then the interface is stopped down (after completion of switching the network). Further, if the interface of the network device is started, the interface processing unit 14*b* notifies the network switch control unit 13*b* of the fact that the concerned network device becomes active.

The link control unit 14*c* manages and controls the state of the link with the network with which the network device 11 communicates. When the process of cutting the link is started in response to an indication given from the application 15, if the target link is being currently connected, the network switching is executed in the network switch control unit 13*b*, the hand-over operation is executed, and then the link is cut off (after completion of switching the network). Further, if the link of the network device is connected, the link control unit 14*c* notifies the network switch control unit 13*b* of the connection of the network.

The network device 11 controls connection of the interface with the network and manages the state of connection according to a network type. For example, the types of networks are network devices (corresponding to the network interface cards) including the wireless LAN 11-1, the FOMA 11-2, the Bluetooth 11-3, the PDC (Personal Digital Cellular) 11-4. In addition to the wireless interface devices, wired interface devices may be included in those types of networks.

The network quality monitor 12 includes a radio intensity monitor unit 12*a* and a radio bandwidth monitor unit 12*b*. The radio intensity monitor unit 12*a* monitors the radio field intensity of each of the network devices 11 at fixed or variable periods or/and each time a packet receipt is started. If a change of network quality is detected, the radio intensity monitor unit 12*a* transmits a network quality change event to the network state management unit 13*a*. The radio bandwidth monitor unit 12*b* monitors a radio bandwidth state of each of the network devices 11 at fixed or variable periods and/or each time a packet receipt is started. If a change of network quality is detected, the radio bandwidth monitor unit 12*b* transmits a network quality change event to the network state management unit 13*a*.

Figure 4:
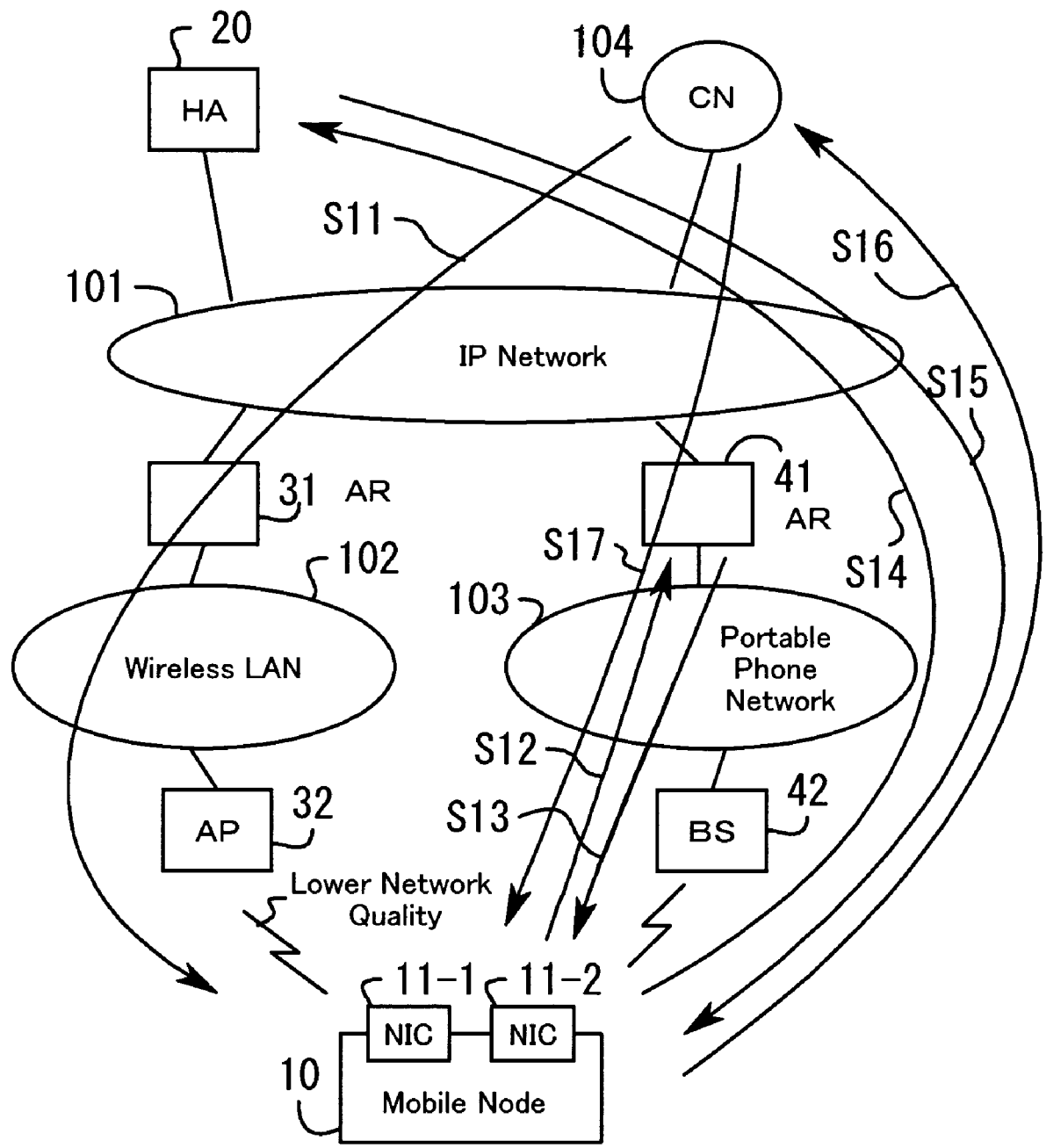
FIG. 4 is a view showing a hand-over operation to be executed when a network quality is lower.

In turn, the hand-over operation of the present invention to be executed when the network quality becomes lower will be discussed in more detail. FIG. 4 illustrates the hand-over operation to be executed when the network quality becomes lower. At first, the description will be oriented to the system configuration of a network, (which is a mere example).

An IP network 101 is connected with a home agent 20, a correspondent node (CN) 104, and access routers (AR) 31 and 41. The wireless LAN 102 is connected with the access router 31 and an access pointer 32. The portable phone network (such as the FOMA) 103 is connected with the access router 41 and a base station (BS) 42.

In the illustrated network system, the mobile node 10 executes the hand-over operation between the different kinds of networks, that is, from the wireless LAN 102 to the portable phone network 103.

[S11] The mobile node 10 communicates with the correspondent node 104 through the IP network 101, the access router 31, the wireless LAN 102 and the access point 32 with the network device 11-1 (the network interface card for the wireless LAN). The packets are transmitted from the correspondent node 104 to the mobile node 10.

[S12] When the intensity of the radio wave received in the network interface card 11-1 is lower or the radio bandwidth of the NIC 11-1 is short, the mobile node 10 detects a lower network quality before the currently used network is disconnected, changes the main interface into the network device 11-2 (the network interface card (NIC) for the portable phone network), and transmits the router solicitation (RS) to the access router 41 located on the portable phone network 103 to be communicable with the NIC 11-2.

[S13] In receipt of the RS, the access router 41 immediately gives back the router advertisement (RA) to the mobile node 10.

[S14] In receipt of the RA, the mobile node 10 generates the care of address to be used in the portable phone network 103 and selects the access router 41 as a default router. Then, the mobile node 10 suppresses upward transmission of packets through the route of the NIC 11-1. Afterwards, the home agent 20 transmits the binding update (BU) (transmit care of address) to the hone agent 20.

In addition, the default router is a router that establishes the most frequently available routes because it is quite difficult to specify all hosts on the internet and all routes to the networks to all the routers.

[S15] When the home agent 20 receives the binding update from the mobile node 10, the home agent 20 updates the database in which the home address of the mobile node 10 corresponds with the care of address (that is, updates the care of address). Then, the home agent 20 gives back the binding acknowledgement (BA) as a response.

[S16] The mobile node 10 transmits the binding update to the correspondent node (CN) 104 being active in communication.

[S17] Afterwards, the corresponding node 104 transmits packets to the mobile node 10 through a new route composed of the IP network 101, the access router 41, the portable phone network 103 and the base station 42.

In the foregoing series of sequences, since the network interface card 11-1 keeps connecting with the wireless LAN 102, the receipt of packets is continued. Hence, if the correspondent node 104 transmits the packets to the mobile node 10 through the wireless LAN 102 before the correspondent node 104 receives the binding update, the mobile node 10 may receive the packets with the network interface card 11-1. Hence, the hand-over operation is made possible with no packet loss.

Figure 5:
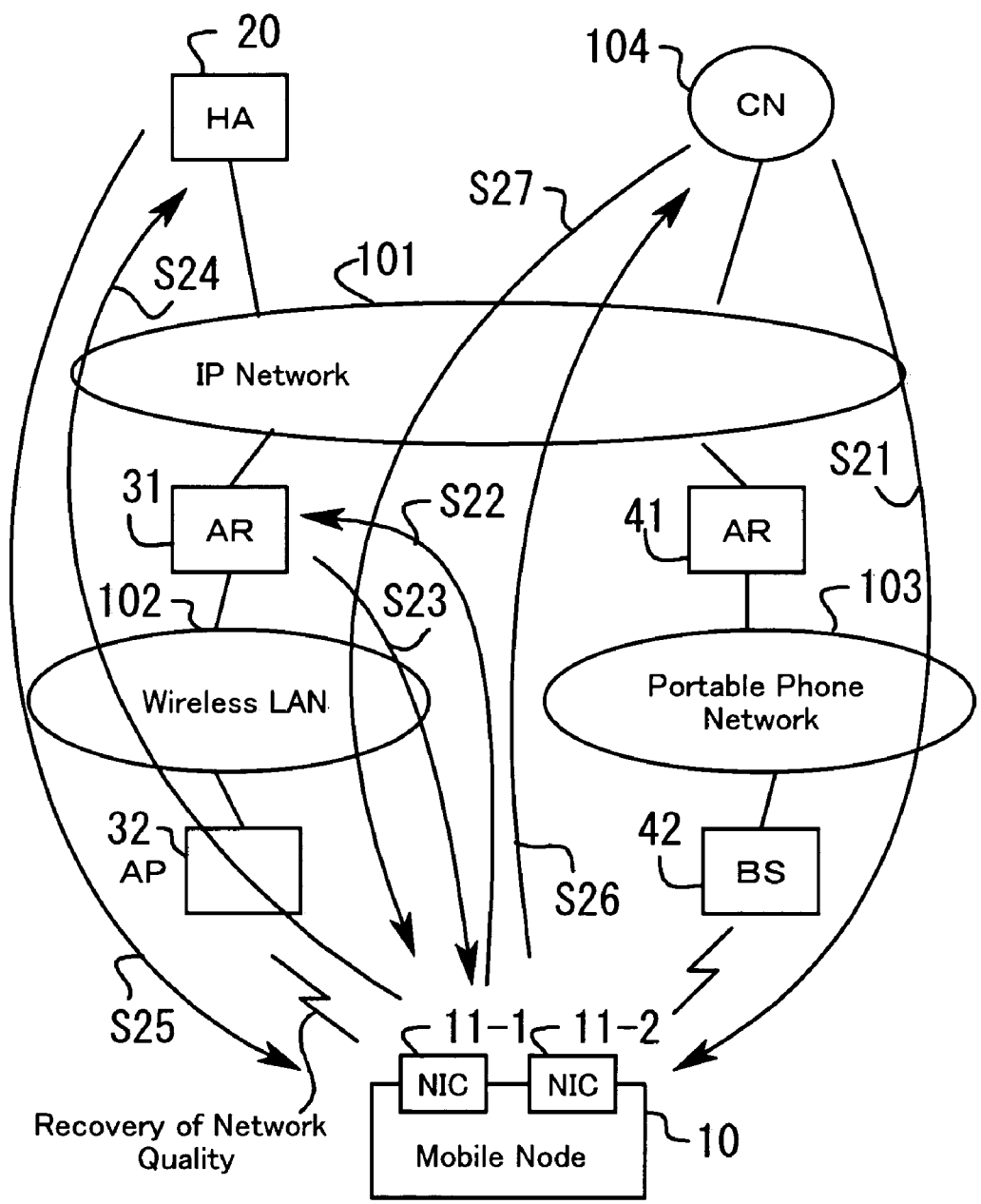
FIG. 5 is a view showing a hand-over operation to be executed when a network quality is recovered.

In turn, the description will be oriented to the hand-over operation of the present invention to be executed when the network is recovered. FIG. 5 shows the hand-over operation to be executed in the recovery of the network quality. It is assumed that in the foregoing hand-over operation shown in FIG. 4, when the mobile node 10 is communicating with the correspondent node 104 through the wireless phone network 103, the network quality on the side of the wireless LAN 102 is recovered.

[S21] The mobile node 10 communicates with the correspondent node (CN) 104 through the IP network 101, the access router (AC) 41, the portable phone network 103 and the base station (BS) 42 with the network interface card (NIC) 11-2. The correspondent node 104 transmits packets to the mobile node 10.

[S22] When the quality of the network oriented to the network interface card (NIC) 11-1 (wireless LAN 102) is recovered, the mobile node 10 detects the recovery, changes its main interface from the NIC 11-2 to the NIC 11-1, and transmits the router solicitation (RS) to the access router (AR) 31 located on the wireless LAN 102.

[S23] In receipt of the router solicitation, the access router 31 immediately gives back the router advertisement (RA) to the mobile node 10.

[S24] In receipt of the router advertisement, the mobile node 10 generates the care of address to be used in the wireless LAN 102 and specifies the route oriented to the NIC 11-1 selected as the main interface as a default route. Further, the mobile node 10 suppresses the upward transmission of packets from the route with the NIC 11-1 as an outset. Afterwards, the mobile node 10 notifies the home agent (HA) 20 of the newly generated care of address as the binding update (BU).

[S25] In receipt of the binding update, the home agent 20 updates the database in which the home address of the mobile node 10 corresponds with the care of address and gives back the binding acknowledgement (BA) as a response.

[S26] The mobile node 10 transmits the BU to the correspondent node 104 being in operation.

[S27] Afterwards, the correspondent node 104 transmits packets to the mobile node 10 through a new route composed of the IP network 101, the access router 31, the wireless LAN 102 and the access point (AP) 32.

In the foregoing series of sequences, since the network interface card 11-2 keeps connecting with the portable phone network 103, the receipt of packets is continued. If, therefore, the correspondent node 104 transmits packets to the mobile node 10 through the portable phone network 103 before the binding update is received, the mobile node 10 may receive those packets with the network interface card 11-2. It means that the hand-over operation is made possible with no packet loss.

The hand-over operation accompanied with recovery of the network quality is executed to switch the portable phone network 103 to the wireless LAN 102 on the assumption that the priority sequence of the wireless LAN 102 is higher than that of the portable phone network 103. However, if the portable phone network 103 has the same priority sequence as the wireless LAN 102, it is not necessary to perform the hand-over operation accompanied with recovery of the network quality though the network quality of the portable phone network 103 does not become lower.

The foregoing hand-over operation is executed between the wireless LAN and the portable phone network. In place, the destination network to be assigned as a result of lowering the radio field intensity of the wireless LAN may be a wired network such as the Ethernet (registered trademark). Further, the network quality is determined on the measured radio field intensity or radio bandwidth. For the wired network, however, the hand-over to the wired network may be executed when the wired network is connected.

In turn, the description will be oriented to the operation of the network quality monitor 12. The network quality monitor 12 provides a timer for monitoring a network quality, in which timer a monitoring period may be rewritten by the application. Further, the process of monitoring a network quality is started at timer-specified periods. In place of the timer-caused start, the function of monitoring a network quality is invoked when a network device for measuring a network quality receives a packet.

The periodic monitoring function is started by a timer handler that is operated when a timer expires, while the monitoring function based on the receipt of a packet is started by a hardware-interrupting handler. In order to identify each type of start, the starting handler specifies an ID for itself as a parameter given when the network quality monitor 12 is started.

In order to prevent an adverse effect onto the system performance resulting from too many starts of quality monitors (that is, in order to prevent excessive load burdened to the processing), provision of a timer for preventing excessive times of monitors makes it possible to suppress more monitoring processes than required. When the network quality monitoring function is started, the timer is checked, and then the network quality is measured about the mounted network devices 11-1 to 11-$n$ through the use of the radio intensity monitor unit 12*a* and the wave bandwidth monitor unit 12*b*.

Figure 6:
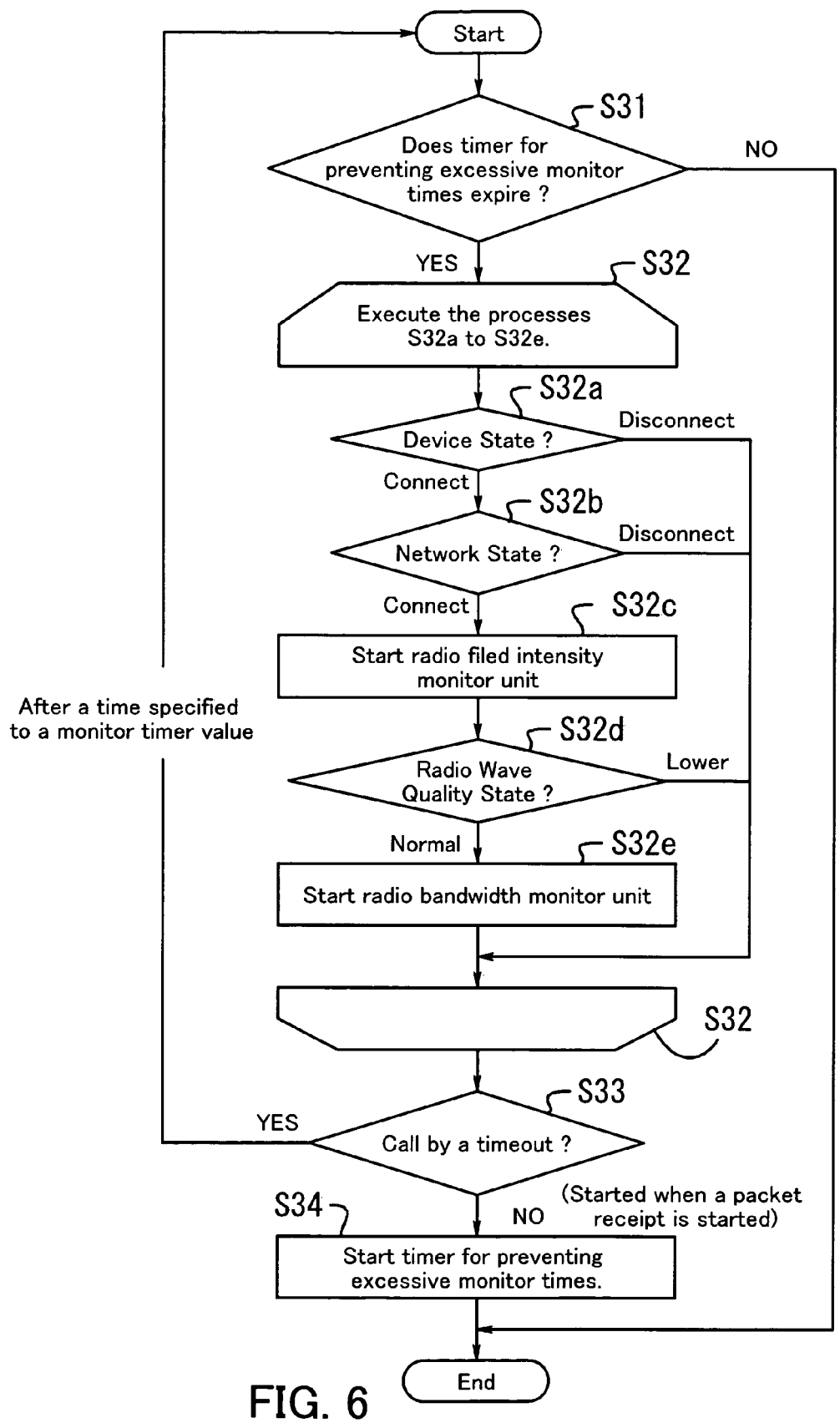
FIG. 6 is a flowchart showing an operation of a network quality monitor included in the mobile node.

FIG. 6 is a flowchart illustrating the operation of the network quality monitor unit 12.

[S31] It is determined if the timer expires. If yes (the time count is finished), the process goes to a step S32, while if not, the process is terminated. If the timer is counting, the network quality is not measured.

[S32] The operations of the steps S32*a* to S32*e* are executed about the mounted network devices 11-1 to 11-$n$ each of which network quality is to be measured.

[S32*a*] It is determined if the device state is connected (the network device 11 is connected with the node. If connected, the process goes to a step S32*b*, while if disconnected, the process goes to a step S33.

[S32*b*] It is determined if the network state is connected (the network device 11 is currently communicating). If connected, the process goes to a step S32*e*, while if disconnected, the process goes to a step S33.

[S32*c*] The radio field intensity monitor unit 12*a* starts its operation.

[S32*d*] If the radio filed intensity is in the normal state, the process goes to a step S32*e*, while if it is in the lower state, the process goes to a step S33.

[S32*e*] The radio bandwidth monitor unit 12*b* starts its operation.

[S33] It is determined if a timeout is called. If called, the process returns to the start step after a time specified in the monitor timer, while if not called, it means the start of measuring the network quality on the receipt of packets and thus the process goes to a step S34.

[S34] The timer for preventing excessive times of monitoring is started for stopping down the process of measuring the network quality.

Figure 7:
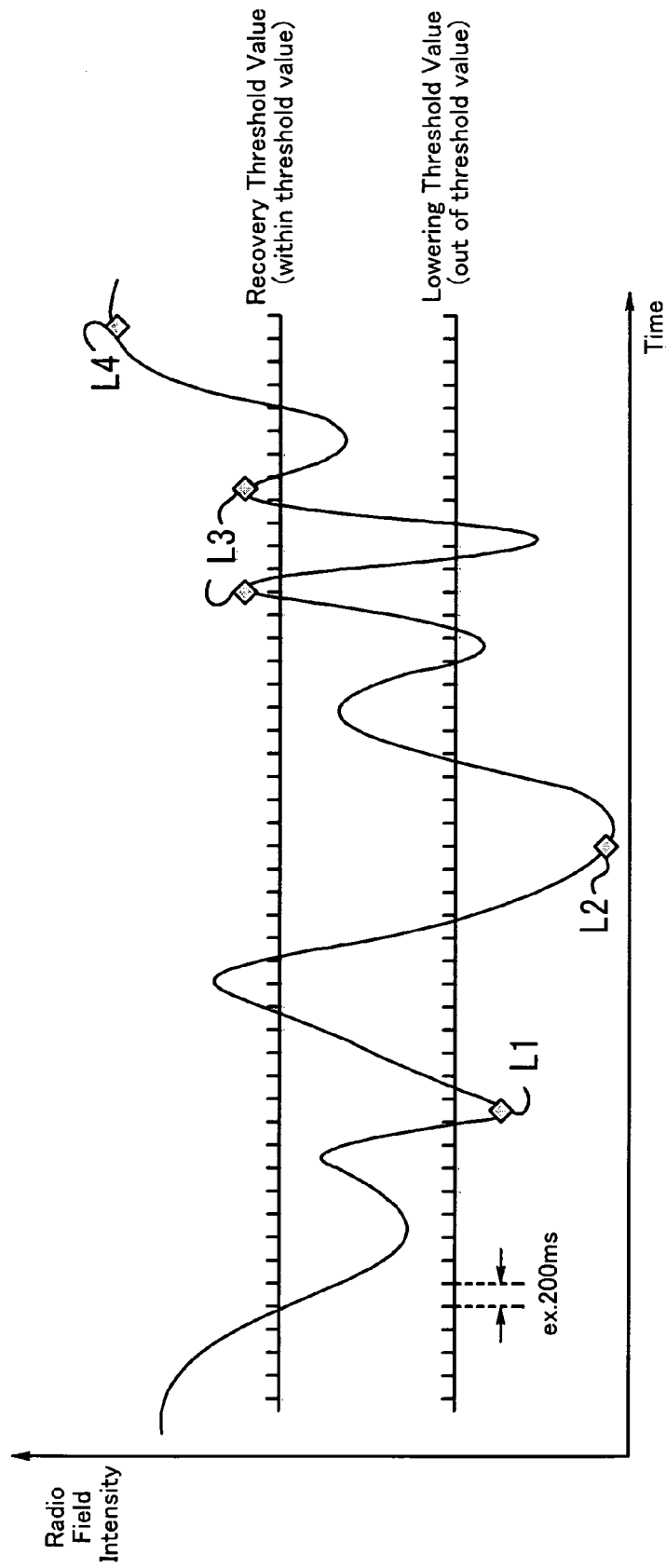
FIG. 7 is a conceptual view showing an operation of a radio field intensity monitor included in the mobile node.

Next, the operation of the radio intensity monitor unit 12*a* will be described below. FIG. 7 illustrates a conceptual operation of the radio intensity monitor unit 12*a*, in FIG. 7, an abscissa denotes a radio field intensity and an ordinance denotes a time. The waveform of a received radio wave is shown in FIG. 7.

The radio intensity monitor unit 12*a* provides two threshold values on which it is determined if the radio state becomes lower or is recovered. One threshold value is a lowering threshold (out of the range) used for determining that the radio field intensity becomes lower, while the other threshold value is a recovery threshold (within the range) used for determining that the radio field intensity is recovered. These threshold values may be optionally adjusted by operating the application 15.

Provision of only one threshold value brings about a disadvantage when a small change of a radio field intensity over the threshold value frequently takes place. That is, each time such a small change over the threshold value takes place, the control is switched frequently, which leads to increasing the processing load burdened onto the system. In order to overcome this disadvantage, the present invention provides two threshold values for lowering and recovery for the purpose of preventing increase of the processing load burdened onto the system. In addition, in FIG. 7, the radio field intensity is measured at a unit of 200 milliseconds.

At first, the radio intensity monitor unit 12*a* reads a radio field intensity of a radio channel being in operation. For reading the radio field intensity, for example, it is possible to take a method of inquiring the radio wave state through the use of the interface with the wireless LAN card.

A lower radio field intensity is detected when the read radio field intensity is lower than the lowering threshold value. In this case, the hand-over operation is executed. However, as on the level L1, if the read radio field intensity is lower than the lowering threshold value for quite a short time, the hand-over operation is not executed. This is because if the hand-over operation is executed in the state that the radio field state is fluctuating around the lowering threshold value, the network switching is fluctuating accordingly, so that the connection may not be controlled stably.

According to the present invention, therefore, in a case that the quality of the received ratio wave is kept lower than the lowering threshold value for a certain length of time, it is determined that the network quality becomes lower. Afterwards, the hand-over operation is executed. For example, as shown in FIG. 7, on the level L2 where the radio field wave is lower than the lowering threshold value by about 600 milliseconds, the hand-over operation is executed.

If the lower radio field intensity is detected, the radio intensity monitor unit 12*a* notifies the network state management unit 13*a* of the lower radio field intensity and specifies its radio field state as a lower value. Since the radio field intensity becomes lower, no quality monitor (radio bandwidth) except that is carried out. Afterwards, when this function is started by a timeout, a timer for the next start is set.

On the other hand, the recovery of the radio field intensity is detected when the radio field intensity read after the lower radio field intensity is larger than the recovery threshold value. In this case, the hand-over operation is executed. However, if, as on the level L3, the actual radio field intensity is higher than the recovery threshold value for quite a short time, no hand-over operation is executed. Like the foregoing ground, this is because if the hand-over operation is executed in the state that the radio field state is fluctuating around the recovery threshold value, the network switching is fluctuating accordingly, so that the connection may not be controlled stably.

According to the present invention, therefore, in a case that the quality of the received radio wave is kept higher than the recovery threshold value for a certain length of time, it is determined that the network quality is recovered. Then, the hand-over operation is executed. For example, in FIG. 7, on the level L4 where the actual radio field intensity is higher than the recovery threshold value by 600 milliseconds, the hand-over operation is executed.

In the case of recovering the radio field intensity, the radio intensity monitor unit 12*a* notifies the network state management unit 13*a* of the recovery of the radio field intensity, specifies its own radio field intensity as a normal value, and then carries out the radio bandwidth monitoring. Further, the use of a statistical method such as the method of moving averages for the radio field intensity results in being able to reduce the adverse effect caused by the temporary radio field intensity variety.

Figure 8:
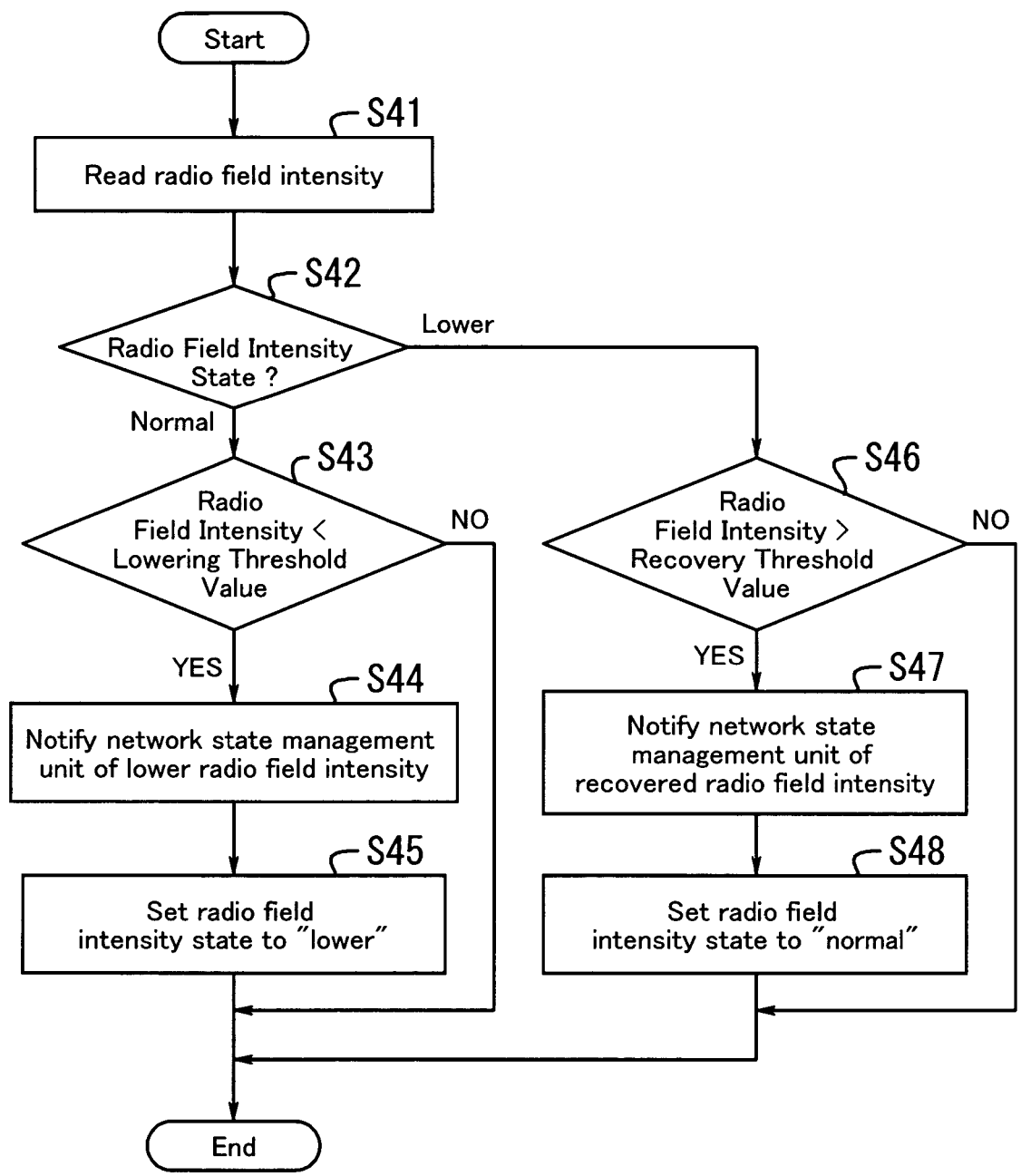
FIG. 8 is a flowchart showing an operation of a radio field intensity monitor included in the mobile node.

FIG. 8 is a flowchart illustrating the operating process of the radio intensity monitor unit 12a.

[S41] The radio intensity monitor unit 12a reads a radio field intensity.

[S42] It is determined if the radio field state is lower. If it is in the normal state, the process goes to a step S43, while if it is lower, the process goes to a step S46.

[S43] It is determined if the radio field intensity is kept lower than the lowering threshold value for a certain length of time. If it is kept lower, the process goes to a step S44, while if it is not, the process is terminated.

[S44] The monitor unit 12a notifies the network state management unit 13a of the lower radio field intensity.

[S45] The lower radio field intensity is set to the network state management unit 13a.

[S46] It is determined if the radio field intensity is kept higher than the recovery threshold value for a certain length of time. If it is kept higher, the process goes to a step S47, while if it is not, the process is terminated.

[S48] The normal radio field intensity is set to the network state management unit 13a.

Figure 9:
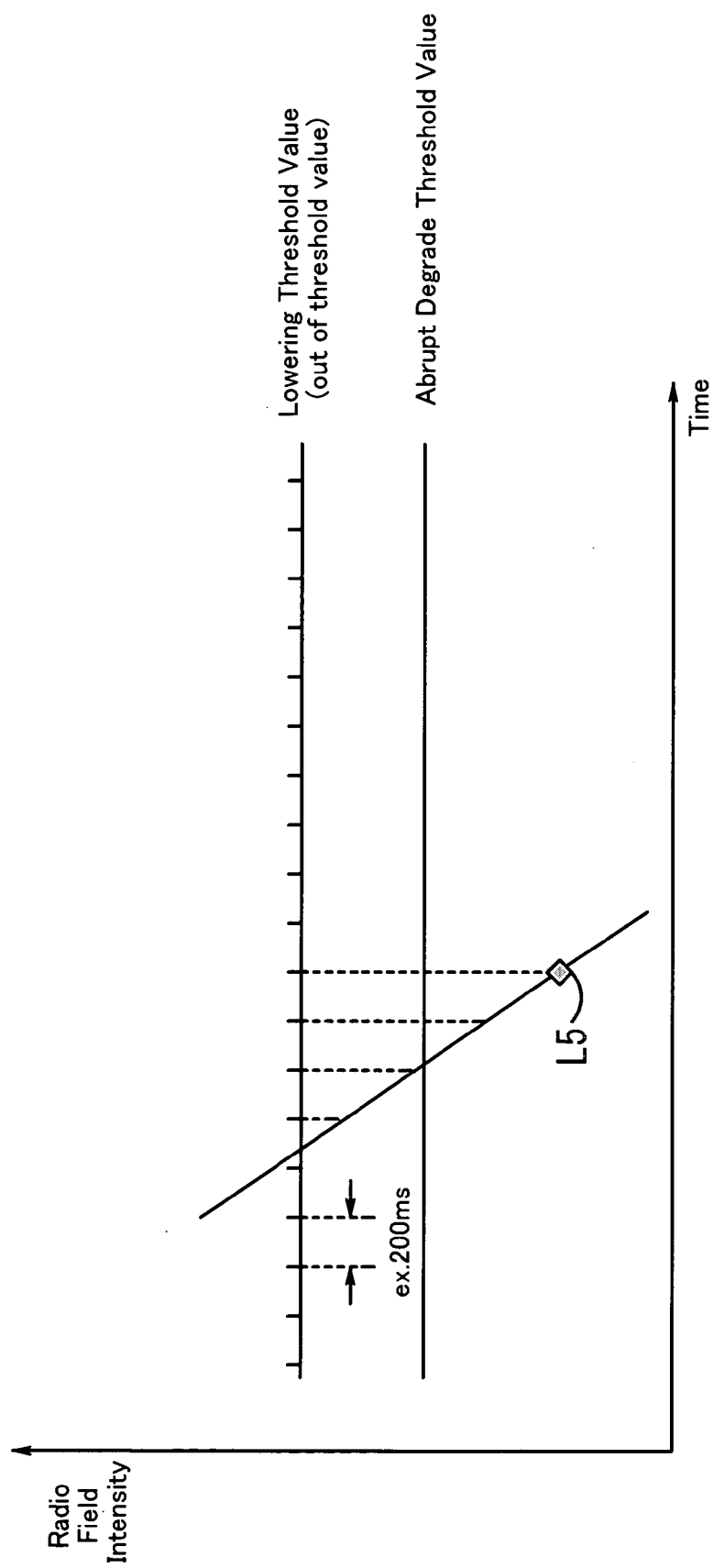
FIG. 9 is a conceptual view showing an operation of a radio field intensity monitor with an abrupt degrade threshold value.

In turn, the description will be oriented to the process of recognizing the lower radio field intensity for the use of an abrupt degrade threshold value and then carrying out the hand-over operation. FIG. 9 illustrates a conceptual operation of the radio intensity monitor unit 12a through the use of the abrupt degrade threshold value, in FIG. 9, an abscissa denotes a radio field intensity and an ordinance denotes a time.

The radio intensity monitor unit 12a provides an abrupt degrade threshold value that is lower than the lowering threshold value. When the radio field intensity is lower than the abrupt degrade threshold value in measuring the radio field intensity, it is determined that no connection with the network being currently operated is kept. Promptly after the determination, the hand-over operation is started, for example, in FIG. 9, on the level L5 where the actual radio field intensity becomes lower than the abrupt degrade threshold value continuously twice at a unit of 200 milliseconds, the hand-over operation is carried out.

As described above, in a case that an unexpected event such as a failure of an access point of the wireless LAN causes the radio wave being currently used to be abruptly degraded, the connection with the network may be cut off. According to the present invention, therefore, in order to cope with such an unexpected event, the abrupt degrade threshold value is set for instantaneously carrying out the hand-over operation. This makes it possible to reduce an interruption time of the communication to a minimum.

In turn, the description will be oriented to the operating process of the radio bandwidth monitor unit 12b. Like the radio intensity monitor unit 12a, the radio bandwidth monitor unit 12b detects the radio field intensity through the use of two shortage and recovery threshold values. The shortage threshold value means a threshold on which a certain radio bandwidth become short because the number of users of the radio bandwidth is increased. That is, the radio bandwidth monitor unit 12b provides a shortage threshold value for determining if the radio bandwidth is short and a recovery threshold value for determining if the radio bandwidth is recovered.

The comparison between the radio bandwidth with the threshold values is analogous to the comparison of the radio field intensity monitoring. As means for reading a radio bandwidth, it is possible to take the method of constantly monitoring the average transfer speed of the packets being actually transferred and accumulating the monitored speeds so that the monitored result may be read out or the method of viewing the control information uniquely mounted in the protocol by the communications company.

Figure 10:
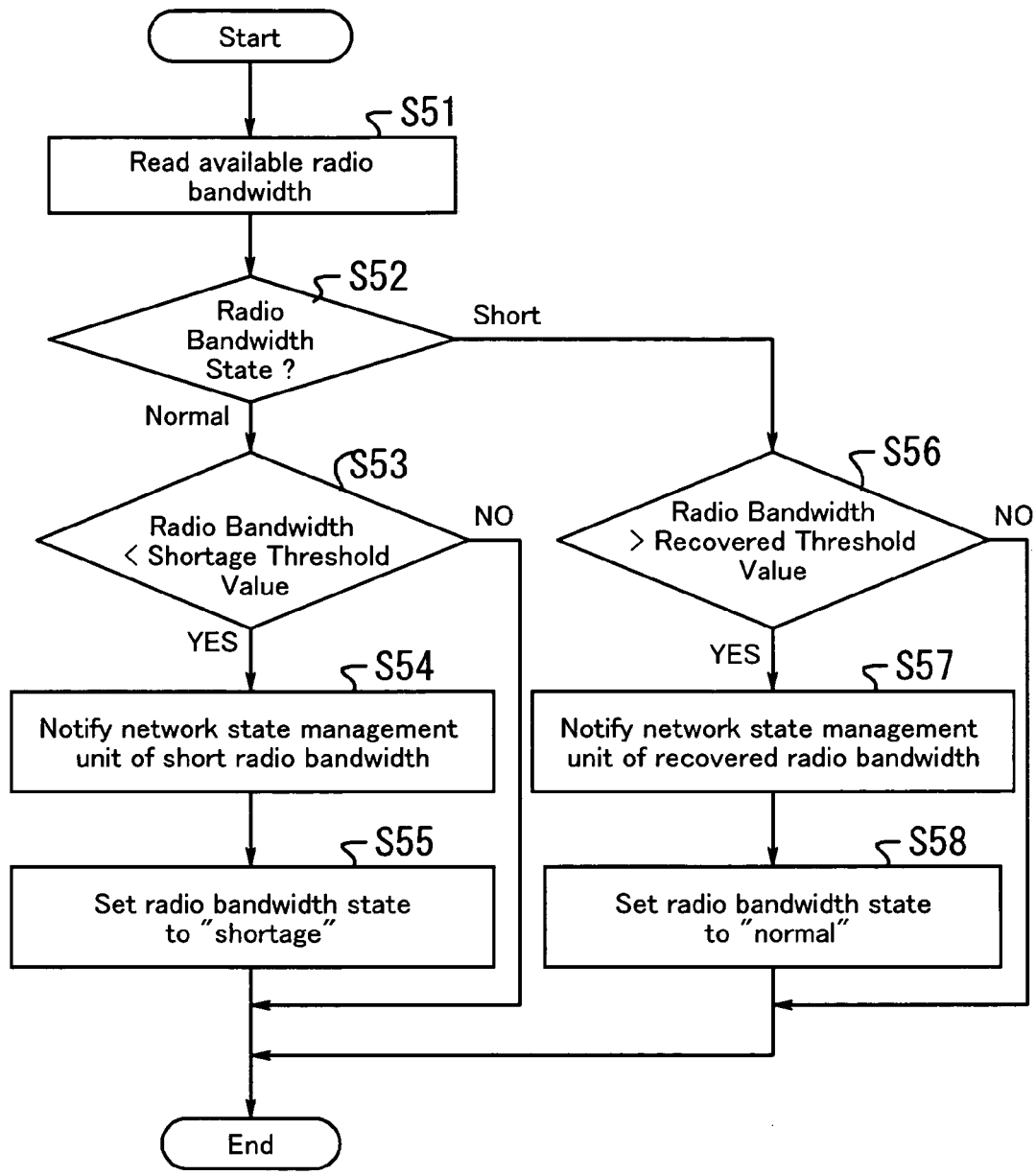
FIG. 10 is a flowchart showing an operation of a radio bandwidth monitor included in the mobile node.

FIG. 10 is a flowchart illustrating the operating process of the radio bandwidth monitor unit 12b.

[S51] The radio bandwidth monitor unit 12b reads a usable radio bandwidth.

[S52] It is determined if the radio bandwidth is short. If it is in the normal state, the process goes to a step S53, while if it is short, the process goes to a step S56.

[S53] It is determined if the radio bandwidth is kept lower than the shortage threshold value for a certain length of time. If it is kept lower, the process goes to a step S54, while if it is not, the process is terminated.

[S54] The monitor unit 12b notifies the network state management unit 13a of the fact that the radio bandwidth is short.

[S55] The short radio bandwidth is set to the network state management unit 13a.

[S56] It is determined if the radio bandwidth is kept higher than the recovery threshold value for a certain length of time. If it is kept higher, the process goes to a step S57, while if it is not, the process is terminated.

[S57] The monitor unit 12b notifies the network state management unit 13a of the recovery of the radio bandwidth.

[S58] The normal radio bandwidth state is set to the network state management unit 13a.

Figure 11:
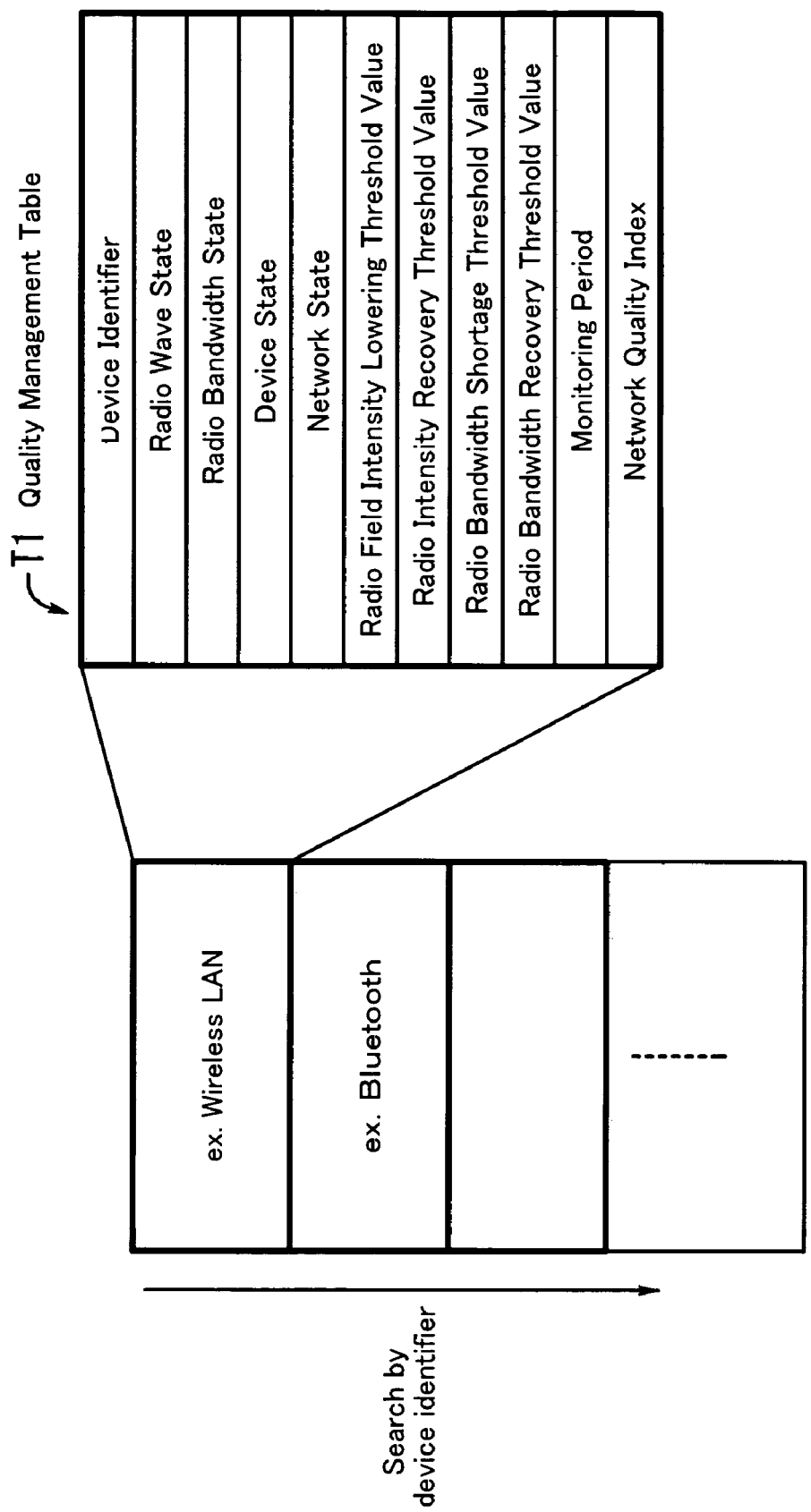
FIG. 11 is a view showing a quality management table.

In turn, the description will be oriented to the quality management table managed by the network quality monitor unit 12. FIG. 11 illustrates the quality management table, which is provided for each of the network devices 11-1 to 11-n.

A device identifier is an identifier that indicates if the concerned network device is a wireless LAN or a portable phone network to each item of the quality management table T1. A radio field state means the radio field intensity in the current communication. A radio bandwidth state means the quality of the radio bandwidth in the current communication. A device state indicates if the concerned network device is available (connectable with a device node). A network state indicates if the network is currently used for communication as a main interface. A lowering threshold of the radio field intensity means a lowering threshold set value. A radio field intensity recovery value means a recovery threshold set value. A radio bandwidth shortage threshold means a set threshold value on which the radio bandwidth is determined to be short. A radio bandwidth recovery threshold means a set threshold value on which the radio bandwidth is determined to be recovered. A monitoring period is set as 200 milliseconds, for example.

A network quality index is derived by weighting the network quality and the user priority. By converting the network quality and the user priority into numbers, the network quality index is calculated by the expression of $\alpha \times$network quality$+ \beta \times$priority ($\alpha$ and $\beta$ are constants).

The hand-over operation based on such a network quality index results in making the hand-over more flexible. For example, in a case that the network N1 has a high user priority but the network N2 has a middle user priority, if a network to be switched only on the priority is selected, the selected result is constantly the network N1.

On the other hand, in a case that the network N1 has a high priority and a low quality but the network N2 has a middle priority and a high quality, by calculating the network quality indexes with respect to the networks N1 and N2, the network N2 is selected as a network to be switched. (That is, the network quality and the priority are considered in the selected result.) The present invention may correspond with a network switch based on the user priority or a network switch based on the network quality index.

In turn, the description will be oriented to the operating process of the network state management unit 13a. The management unit 13a holds a network quality (normal or lower) of the interface (network device) being currently used as a main one or each interface.

In a case that the network state management unit 13a receives a notice of the lower radio field intensity from the radio intensity monitor unit 12a, if the radio field state of the interface is normal, the set value is changed into the lower quality state. If the target interface is used as a main device, the network state management unit 13a transmits a request for switching a network to the network switch control unit 13b.

In a case that the recovery is notified by the radio intensity monitor unit 12a, if the radio field intensity of the target interface is in the lower state, the management unit 13a returns the network quality into the normal state and transmits a request for switching a network to the network switch control unit 13b. The same control as described above is carried out with respect to the radio bandwidth quality.

Figure 12:
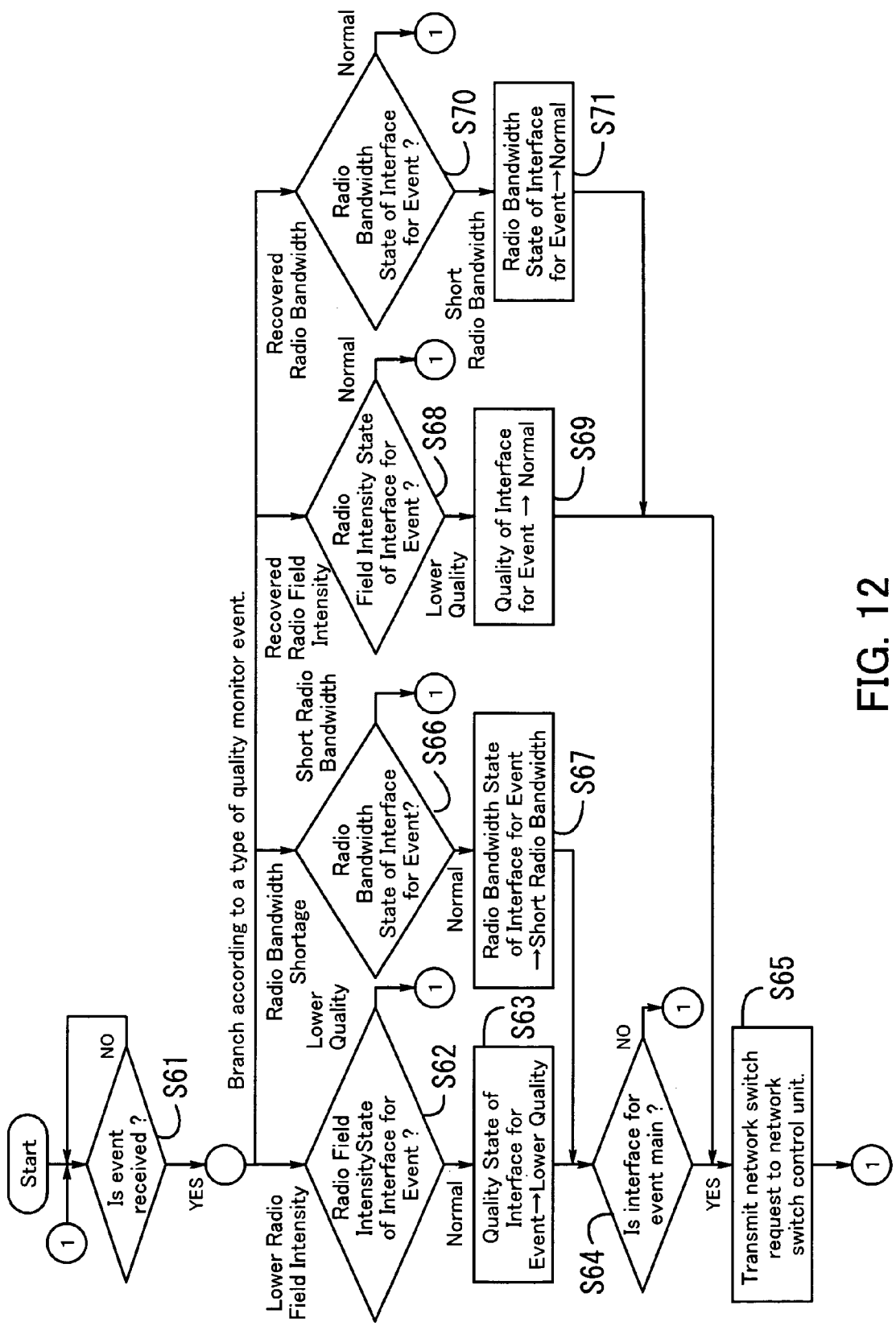
FIG. 12 is a flowchart showing an operation of a network state management unit included in the mobile node.

FIG. 12 is a flowchart illustrating the operating process of the network state management unit 13a.

[S61] It is determined if a network quality monitor event is received. If received, the process is branched according to a type of the received event.

[S62] If the event of the lower radio field intensity is received, it is determined if the quality of the current interface (network device) with which the event is concerned is in the lower state or the normal state. If it is in the lower state, the process returns to the step S61 without changing the setting as it is, while if it is in the normal state, the process goes to a step S63.

[S63] The management unit 13a changes the setting of the network device with which the event is concerned from the normal state to the lower state.

[S64] It is determined if the network device with which the event is concerned is a main interface. If it is not, the process returns to the step S61, while if it is the main interface, the process goes to a step S65.

[S65] The management unit 13a transmits a request for switching a network to the network switch control unit 13b.

[S66] If an event of the short radio bandwidth is received, it is determined if the quality of the current interface (network device) with which the event is concerned is in the short radio bandwidth state or in the normal state. If it is in the former, the process returns to the step S61 without changing the setting as it is, while if it is in the latter, the process goes to a step S67.

[S67] The management unit 13a changes the setting of the network device with which the event is concerned from the normal state into the short radio bandwidth state. Then, the process goes to the step S64.

[S68] If an event of the recovered radio field intensity is received, it is determined if the quality of the current interface (network device) with which the event is concerned is in the lower state or the normal state. If it is in the normal state, the process returns to the step S61 without changing the setting as it is, while if it is in the lower state, the process goes to a step S69.

[S69] The management unit 13a changes a setting of the network device with which the event is concerned from the lower state into the normal state. Then, the process goes to the step S65.

[S70] If an event of the recovered radio bandwidth is received, it is determined if the quality of the current interface (network device) with which the event is concerned is in the short state or the normal state. If it is the normal state, the process returns to the step S61 without changing the setting as it is, while if it is in the short bandwidth, the process goes to a step S71.

[S71] The management unit 13a changes a setting of the network device with which the event is concerned from the short state into the normal state. Then, the process goes to the step S65.

In turn, the description will be oriented to the operating process of the network switch control unit 13b. The network switch control unit 13b is assigned priority and managed by the mounted network device. In a case that the network switch control unit 13b receives a request for switching a network, the network switch control unit 13b searches the network state of the mounted network device in higher priority sequence. In this search, the interface in the normal state is specified as a main interface.

In a case that the main interface is changed, the network switch control unit 13b transmits a request for changing the main interface to the network controller 14 and a request for transmitting a router solicitation (RS) to the hand-over execution unit 13c and puts itself into the state of waiting for a router advertisement (RA). In response, the router solicitation is transmitted to the access router located on the network. The router solicitation is outputted by the changed main interface.

The receipt of the router advertisement from the access router is notified from the packet input unit 16 to the network switch control unit 13b through the terminal management unit 13d. When the router advertisement is received by the main interface, the network switch control unit 13b transmits a request for switching a route to the network controller 14, switches a default router, and issues a request for transmitting a binding update (BU) to the home agent (HA) to the hand-over execution unit 13c. Lastly, the receipt of the binding acknowledgement (BA) given back from the home agent results in completing the hand-over operation.

Figure 13:
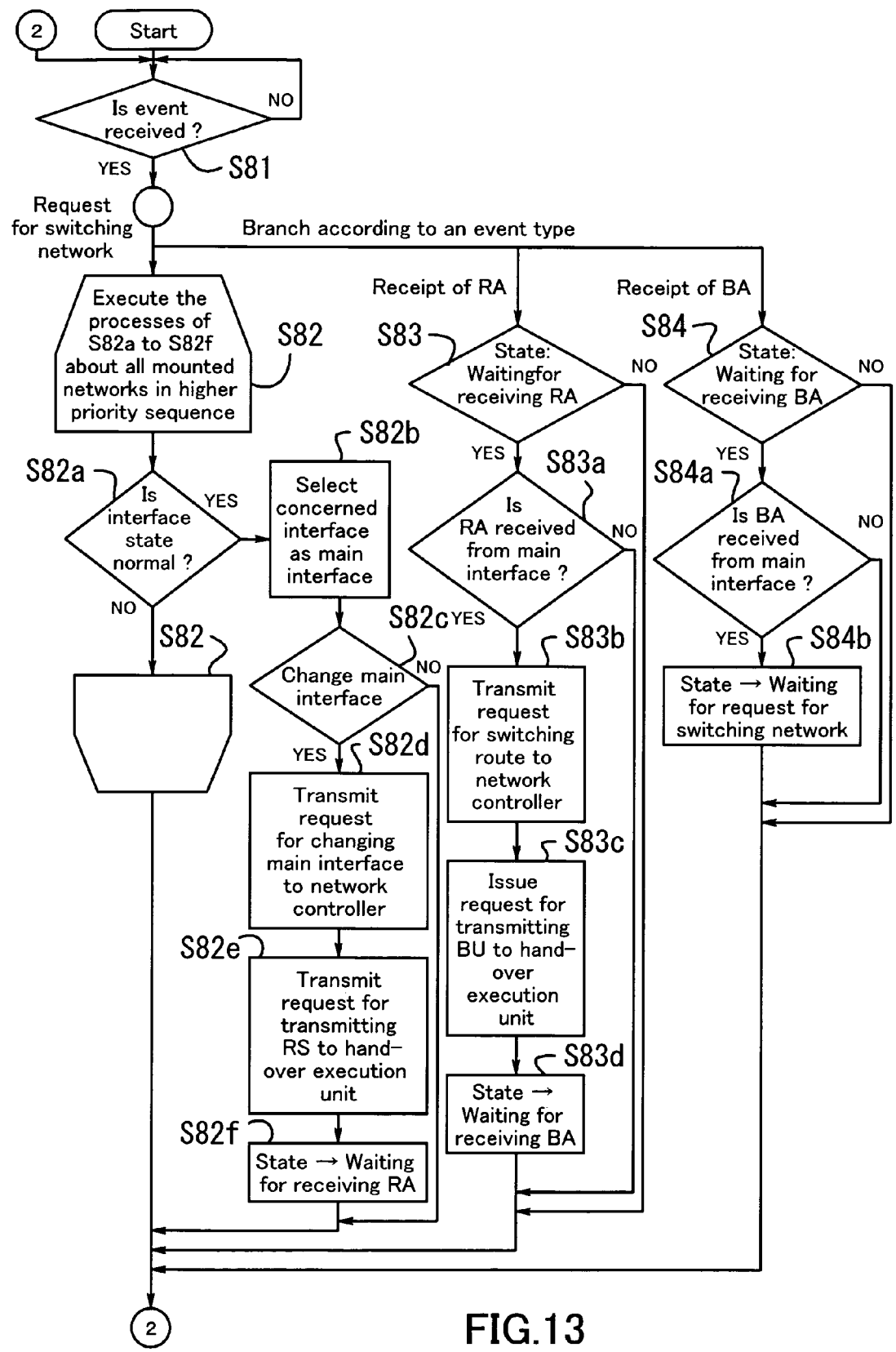
FIG. 13 is a flowchart showing an operation of a network switch controller included in the mobile node.

FIG. 13 is a flowchart illustrating the operating process of the network switch control unit 13b.

[S81] It is determined if an event is received. If received, the process is branched according to a type of the received event.

[S82] If the request for switching a network is received, the operation of the steps S82a to S82f is executed with respect to all networks in higher priority sequence.

[S82a] It is determined if the interface is in the normal state. If it is not in the normal state, the process goes to the step S81, while if it is in the normal state, the process goes to a step S82b.

[S82b] The concerned network device is selected as the main interface.

[S82c] It is determined if the main interface is to be changed. If changed, the process goes to a step S82d, while if not changed, the process goes to a step S81.

[S82d] The switch control unit 13b transmits a request for changing the main interface to the network controller 14.

[S82e] The switch control unit 13b transmits a request for transmitting a router solicitation (RS) to the hand-over execution unit 13c. Then, the process goes to a step S82f.

[S82f] The switch control unit 13b puts itself in the state of waiting for a router advertisement (RA). Then, the process returns to the step S81.

[S83] If the event type is a receipt of the RA, it is determined if the switch control unit 13b is in the state of waiting for the RA. As waiting for the RA, the process goes to a step S83a, while if not, the process is terminated.

[S83a] It is determined if the event is received from the main interface. If it is, the process goes to a step S83b, while if it is not, the process is terminated.

[S83b] The switch control unit 13b transmits a request for switching a route to the network controller 14.

[S83c] The switch control unit 13b issues a request for transmitting the binding update to the hand-over execution unit 13c.

[S83d] The switch control unit 13b puts itself into the state of waiting for the binding acknowledgement (BA). Then, the process goes back to the step S81.

[S84] If the event type is a receipt of the binding acknowledgement (BA), it is determined if the switch control unit 13b is in the state of waiting for the BA. If yes, the process goes to a step S84a, while if not, the process is terminated.

[S84a] It is determined if the event is received from the main interface. If yes, the process goes to a step S84b, while it not, the process is terminated.

[S84b] The switch control unit 13b puts itself in the state of waiting for the network switch request. Then, the process goes back to the step S81.

Figure 14:
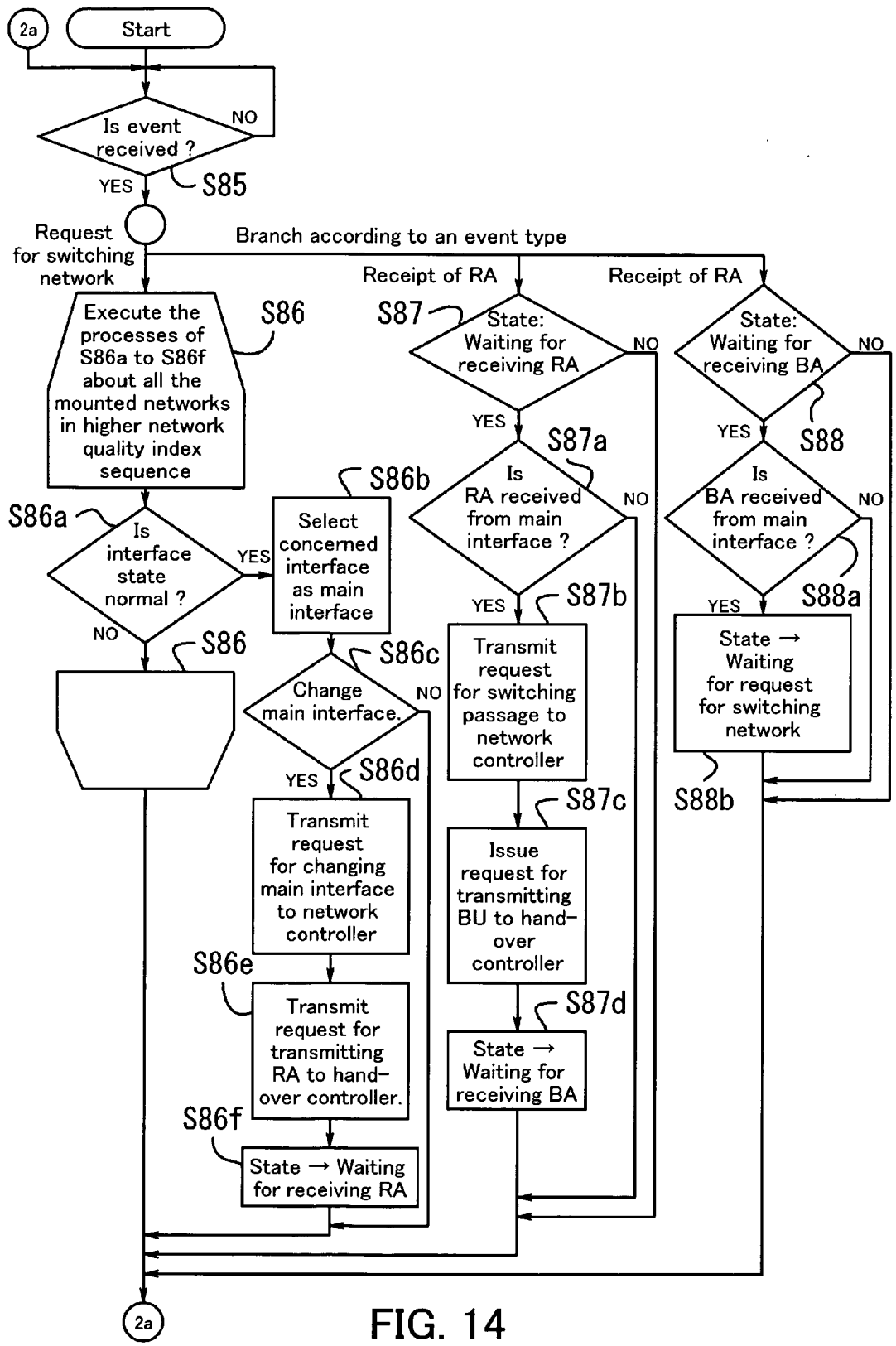
FIG. 14 is a flowchart showing an operation of the network switch controller.

FIG. 14 is a flowchart illustrating the operating process of the switch control based on the network quality index included in the process of the network switch control unit 13b.

[S85] It is determined if an event is received. If received, the process is branched according to a type of the received event.

[S86] If a request for switching a network is received, the operation of the steps S86a to S86f is carried out with respect to all networks in higher sequence of network quality indexes.

[S86a] It is determined if the interface is in the normal state. If it is not, the process goes to the step S85, while if it is, the process goes to a step S86b.

[S86b] The concerned network device is selected as a main interface.

[S86c] It is determined if the main interface is changed. If changed, the process goes to a step S86d, while if not changed, the process goes back to the step S85.

[S86d] The switch control unit 13b transmits a request for changing the main interface to the network controller 14.

[S86e] The switch control unit 13b transmits a request for transmitting a router solicitation (RS) to the hand-over execution unit 13c. Then, the process goes to a step S86f.

[S86f] The switch control unit 13b puts itself in the state of waiting for a router advertisement (RA). Then, the process goes back to the step S85.

[S87] If the event type is a receipt of the router advertisement, it is determined if the switch control unit 13b puts itself in the state of waiting for the router advertisement. If yes, the process goes to a step S87a, while if no, the process is terminated.

[S87a] It is determined if the event is received from the main interface. If it is received from the main interface, the process goes to a step S87b, while if it is not, the process is terminated.

[S87b] The switch control unit 13b transmits a request for switching a route to the network controller 14. Then, the process goes back to the step S85.

[S87c] The switch control unit 13b issues a request for transmitting a binding update (BU) to the hand-over execution unit 13c.

[S87d] The switch control unit 13b puts itself in the state of waiting for a binding acknowledgement (BA).

[S88] If the event type is a receipt of the binding acknowledgement, it is determined if the switch control unit 13b is in the state of waiting for the binding acknowledgement. If yes, the process goes to a step S88a, while if no, the process is terminated.

[S88a] It is determined if the event is received from the main interface. If yes, the process goes to a step S88b, while if no, the process is terminated.

[S88b] The switch control unit 13b puts itself in the state of waiting for a network switch request. Then, the process goes back to the step S85.

In turn, the description will be oriented to the operation of the network controller 14. In receipt of the request for changing a main interface, the network controller 14 switches the main interface. Further, in receipt of the request for switching a route, the network controller 14 specifies a default route as an interface direction and makes the other routes to the interface inactive so that packets may not be transmitted in any other direction rather than the specified interface direction.

Figure 15:
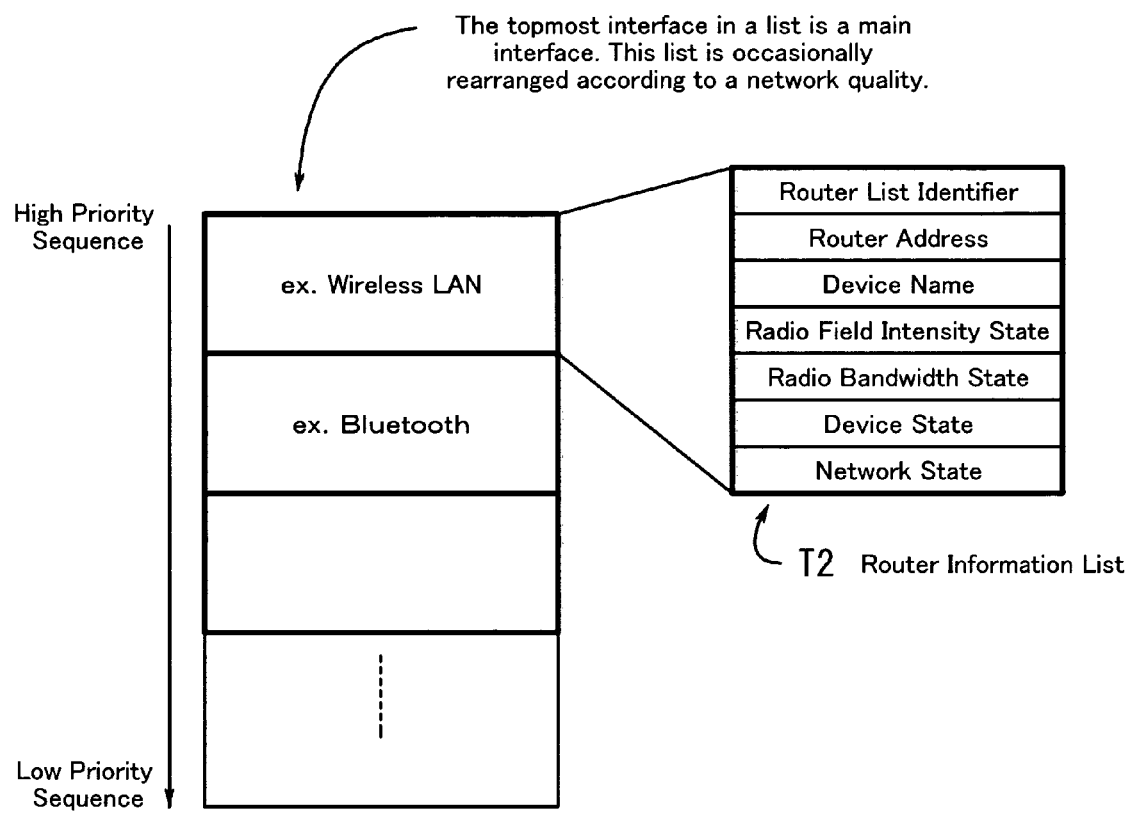
FIG. 15 is a view showing a router information list for controlling a route.

FIG. 15 illustrates a router information list for controlling a route. The router information list T2 is managed by the network controller 14. In FIG. 15, the main interface is the corresponding interface with the router information item located at the uppermost stage.

Each item of the router information list T2 will be described. A router list identifier is an identifier that identifies the router list as that for the wireless LAN or that for the portable phone network. A router address is an address of a router connected with the concerned network device in the current communication. A device name is a name of a network device (the wireless LAN device or the portable phone network device). A radio field intensity state is a radio field intensity of the current communication. A radio bandwidth state is a radio bandwidth quality of the current communication. A device state indicates whether or not the concerned network device is available. A network state indicates whether or not the network is currently used as the main interface.

Figure 16:
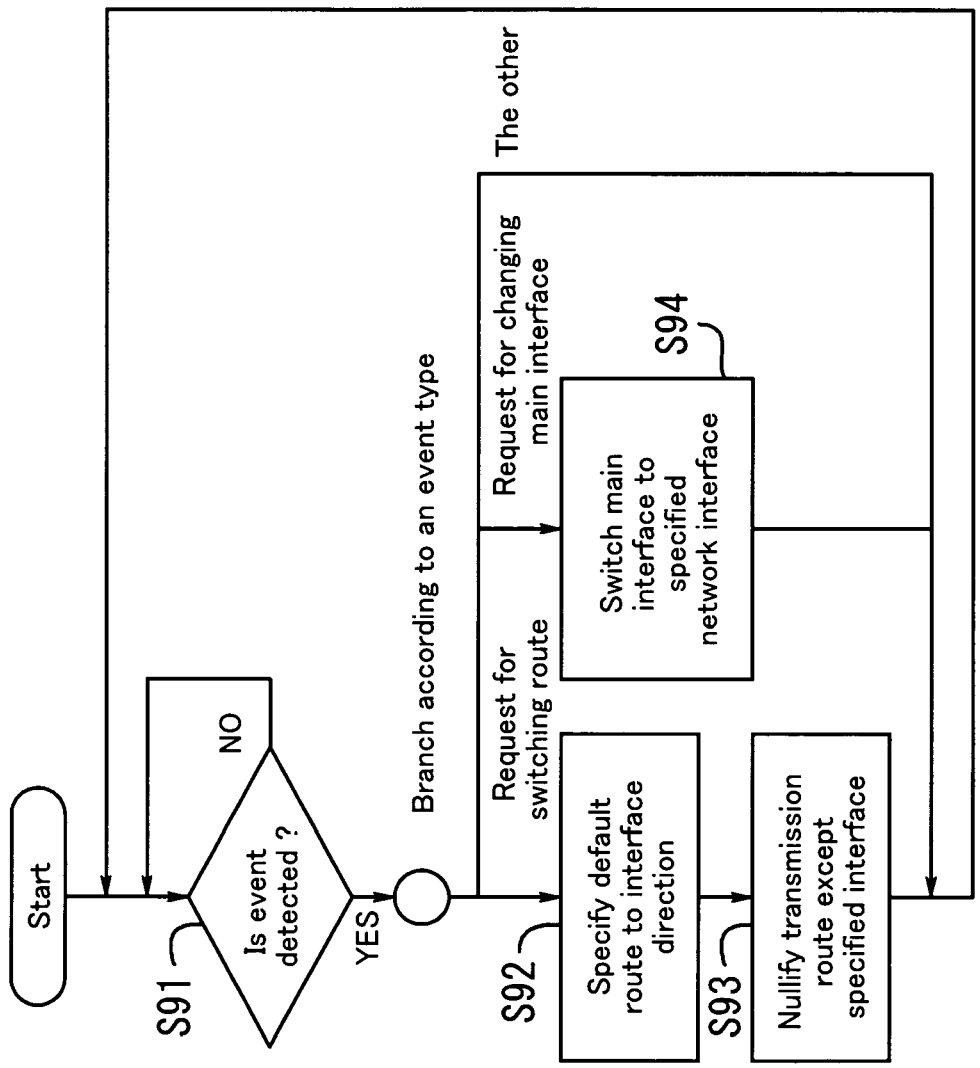
FIG. 16 is a flowchart showing an operation of a network controller included in the mobile node.

FIG. 16 is a flowchart illustrating the operating process of the network controller 14.

[S91] It is determined if an event is received. If received, the process is branched according to the type of the received event.

[S92] If a request for switching a route is received, the network controller 14 specifies a default route as an interface direction.

[S93] The network controller 14 makes any other transmission route rather than the specified interface direction inactive. Then, the process goes back to the step S91.

[S94] If a request for changing the main interface is received, the network controller 14 switches the main interface into the specified one. Then, the process goes back to the step S91.

In turn, the description will be oriented to the hand-over operation of the present invention accompanied with stop and start of the network device. The start and stop of the network device 11 may be handled by the application 15. According to the present invention, by switching the interface before the network device is actually stopped in response to a stop request, the hand-over operation is executed at fast speed. This makes it possible to reduce a packet loss accompanied with stop of the interface being used.

Further, if the network device 11 being stopped is required to be started, the switch is required after executing the operation of starting the interface. This is because if a switch request is transmitted before completion of the starting process, the network oriented to the network device that has no capability of communication is made to be a default route and thereby a packet loss may be brought about.

In the case of receiving a request for stopping the interface, the interface processing unit 14b included in the network controller 14 changes the quality of the network device into the stop state and then transmits a request for switching a network to the network switch control unit 13b. Then, the network switch control unit 13b selects the network device with top priority from the network devices keeping their network qualities normal and performs the hand-over operation to the network to which the selected device is oriented. Afterwards, the interface processing unit 14b cuts off the interface of the network device. Further, in the case of receiving a request for starting a device, after executing the process of starting the network device, the interface processing unit 14b transmits a request for switching a network to the network switch control unit 13b.

Figure 17:
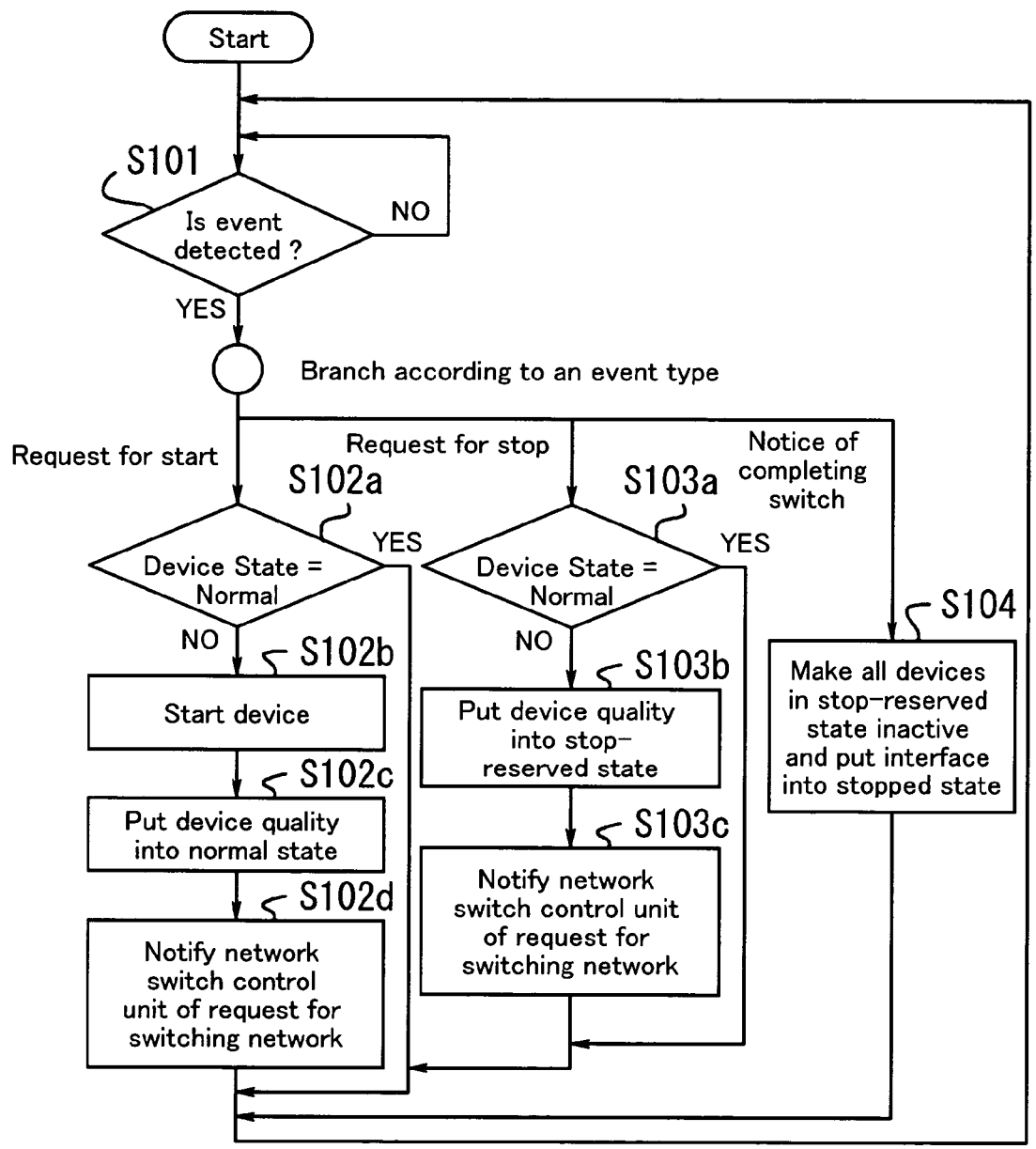
FIG. 17 is a flowchart showing an operation of an interface processing unit included in the mobile node.

FIG. 17 is a flowchart illustrating the operating process of the interface processing unit 14b.

[S101] It is determined if an event is received. If received, the process is branched according to a type of the received event.

[S102a] If a start request is received, it is determined if the device state is in the normal state. If yes, the process goes back to the step S101, while if no, the process goes to a step S102b.

[S102b] The process of starting a device is executed.

[S102c] The processing unit 14b puts the quality of the device into the normal state.

[S102d] The processing unit 14b notifies the network switch control unit 13b of the request for switching a network. Then, the process goes back to the step S101.

[S103a] If the stop request is received, it is determined if the device state is in the normal state. If yes, the process goes back to the step S101, while if no, the process goes to a step S103b.

[S103b] The processing unit 14b puts the quality of the device into a stop-reserved state.

[S103c] The processing unit 14b notifies the network switch control unit 13b of the request for switching a network. The process goes back to the step S101.

[S104] If a notice for completing the switch is received, the processing unit 14b makes all the devices in the stop-reserved states inactive and puts the interface into the stopped state. Then, the process goes back to the step S101.

As described above, in a case that an interface-down (stop) process is requested from the upward application, if the network connected with the target interface is currently used, the interface-down (stop) process is not executed promptly. The operation is executed to switch the currently used network into another network and carry out the hand-over. After completion of the operation, the interface-down (stop) process is executed. This allows the interface-down process to continue the communication with no interruption if the mobile node 10 is being communicated.

In turn, the description will be oriented to the hand-over operation of this invention accompanied with connection or disconnection of the link. The connection or disconnection of the network may be handled by the application 15. According to the present invention, however, before actually disconnecting the link in response to a request for disconnecting the link, the network is switched for speeding up the hand-over operation. This results in being able to reduce the packet loss accompanied with stop of the network being used.

In a case that the link connection is requested when the network device is being disconnected, the switch is required after the process of connecting the interface is accomplished. This is because if the switch request is transmitted before completing the link connecting process, the network having no capability of communication is specified as a default route and thereby the packet loss may be brought about.

Figure 18:
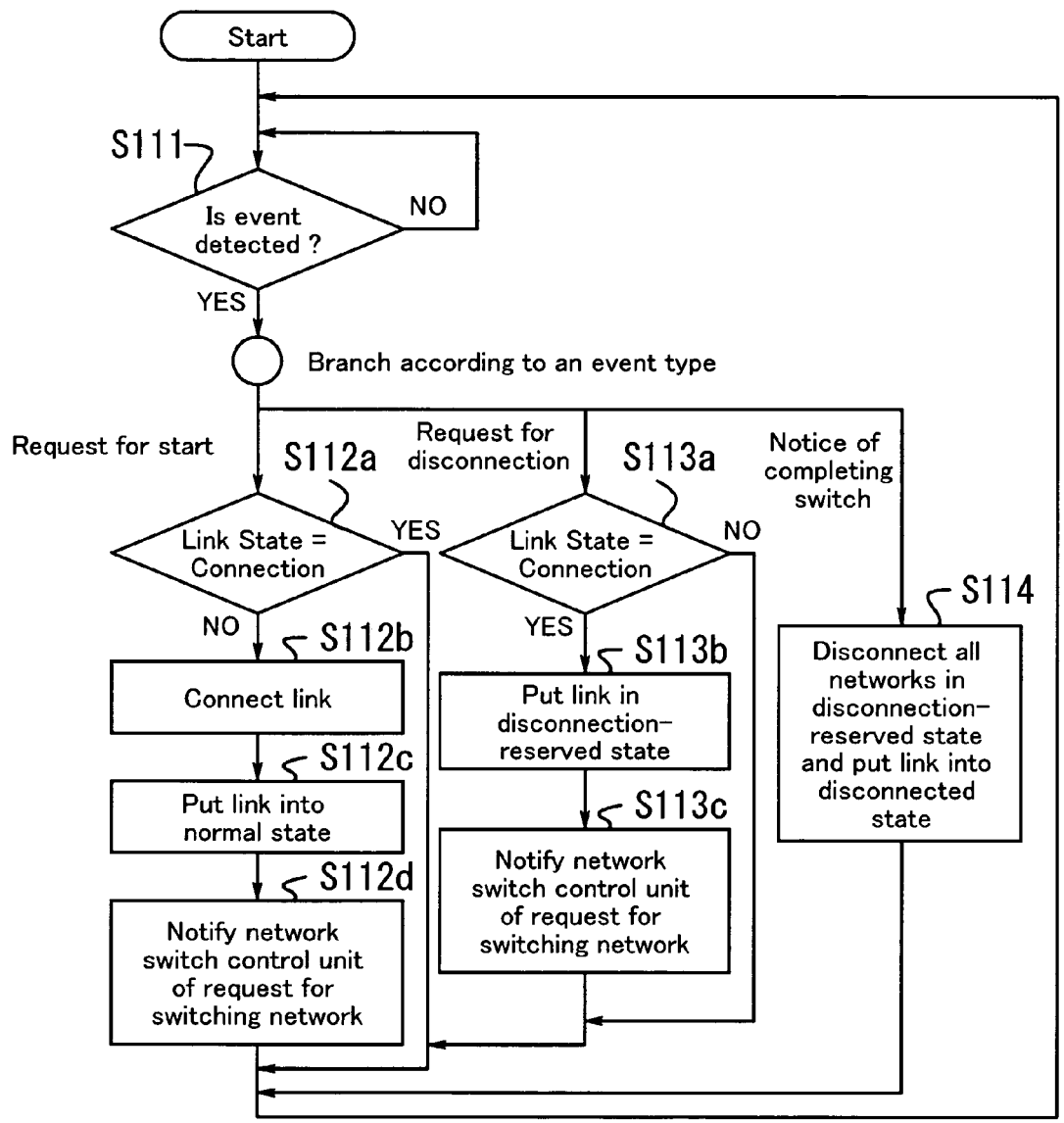
FIG. 18 is a flowchart showing an operation of a link processing unit.

FIG. 18 is a flowchart illustrating the operating process of the link processing unit 14c.

[S111] It is determined if an event is received. If received, the process is branched according to a type of the received event.

[S122a] If a start request is received, it is determined if the link is in the connecting state. If yes, the process goes back to the step S111, while if no, the process goes to a step S112b.

[S112b] The link processing unit 14c performs a link connecting process.

[S112c] The link processing unit 14c puts the link state into the normal state.

[S112d] The link processing unit 14c notifies the network switch control unit 13b of a request for switching a network. Then, the process goes back to the step S111.

[S113a] If a disconnection request is received, it is determined if the link is in the connecting state. If yes, the process goes back to the step S111, while if no, the process goes to a step S113b.

[S113b] The link processing unit 14c puts the link state into a disconnection-reserved state.

[S113c] The link processing unit 14c notifies the network switch control unit 13b of a request for switching a network. Then, the process goes back to the step S111.

[S114] If a notice of completion of switch is received, the link processing unit 14c disconnects all the networks being in the disconnection-reserved state and puts the link into the disconnected state. Then, the process goes back to the step S111.

As described above, in a case that a link disconnecting process such as disconnection of a phone network is required by the upward application, if the target link is the currently used network, the link disconnecting process is not carried out promptly. At first, the link processing unit 14c executes the process of switching the currently used network into another network and the hand-over control and then carries out the link disconnecting process after the completion of the former process. This allows the link disconnecting process to continue the communication with no interruption even if the mobile node is in communication.

Figure 19:
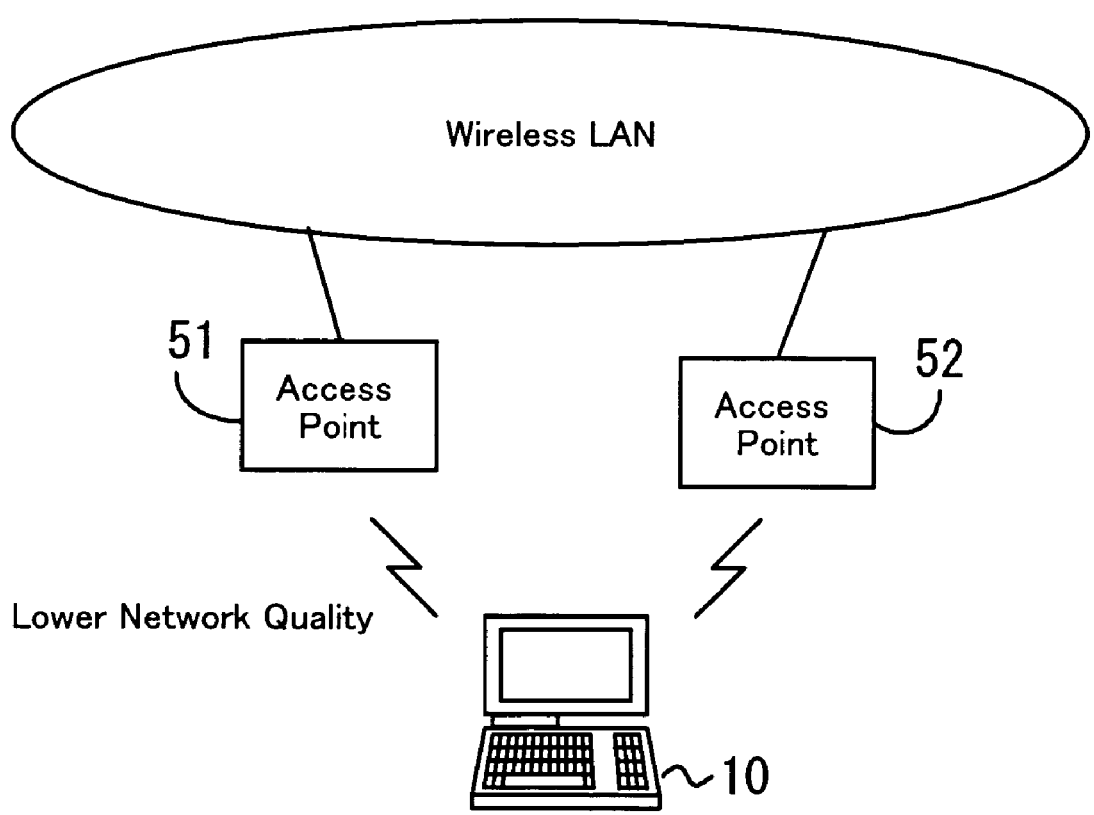
FIG. 19 is an explanatory view showing a hand-over operation of switching an access point.

In turn, the description will be oriented to the hand-over operation of the present invention accompanied with switch of an access point. FIG. 19 illustrates the hand-over operation for switching an access point. The wireless LAN is connected with access points 51 and 52. At first, it is assumed that the mobile node 10 is in communication through the access point 51.

If the access point 51 lowers its radio field intensity, the mobile node 10 performs the hand-over operation. The aforementioned hand-over operations have concerned with the hand-over between the different kinds of networks. In this illustration, the access point is switched in the same network.

In FIG. 19, if the access point 51 lowers its radio field intensity, the access point 52 is specified as the switching destination and then the hand-over operation is carried out. In a case that the wireless LAN is selected as a connecting medium candidate when the radio field intensity of the currently used radio communication becomes lower, the operation is executed to search a connectable access point before the currently used radio communication is disabled. Then, when the access point cannot keep the currently used radio communication connected therewith, the instantaneous hand-over to the access point searched in advance is carried out for stably continuing the communication. The detailed control of the hand-over of the access point is the same as the hand-over control between different kinds of networks. Hence, the detailed control thereof is not described herein.

The foregoing embodiment has concerned with switching of an access point in the same wireless LAN. This hand-over may concern with switching of an access point between different wireless LANs. (For example, it concerns with switching of an access point 51a on the wireless LAN 5a into an access point 51b on the wireless LAN 5b.)

As described above, according to the present invention, the hand-over operation on the mobile IP network includes no time of interrupting the communication with the network, so that the packet loss may be eliminated. Hence, the present invention may provide a user with the seamless hand-over of the network with no interruption of the IP communication of speech or images.

For example, in a case that a user speaks with an IP phone provided with the function of the invention, the user is unconscious of a communication interruption accompanied with the network switch. Further, when a user is moving as watching streaming data like a motion picture, no stop of a moving image accompanied with the network switch takes place.

Further, the present invention provides a lowering threshold value and a recovery threshold value for each of the radio field intensity and the radio bandwidth on which threshold values the network switch is controlled. This makes it possible to stably control the network connection. Hence, even around the border between the wireless networks, that is, in the area where the radio field intensity is fluctuating, the present invention is capable of suppressing fluctuation of the network and occurrence of noises caused by the fluctuation to a minimum, thereby being able to supply a user with stable high-quality communications.

As set forth above, the mobile node according to the present invention is arranged to transmit the care of address to the address registering destination before the communication is disconnected according to the quality state of the network, change the route of the information being communicated, carry out the hand-over operation for switching the connecting destination to a new network, updating the care of address in the address registering destination, and keeping the function of receiving packet data from the network before being switched until the communication is disconnected. This makes it possible to eliminate the time of interrupting the communication and keep the continuance of the communication excellent, thereby being able to improve the quality of communication in the mobile IP network.

The foregoing is considered as illustrative only of the principles of the present invention. Further, since numerous modifications and changes will readily occur to those skilled in the art, it is not desired to limt the invention to the exact construction and applications shown and described, and accordingly, all suitable modifications and equivalents may be regarded as falling within the scope of the invention in the appended claims and their equivalents.

What is claimed is:

1. A mobile node having a capability of performing communications on a mobile IP (Internet Protocol) network, comprising:

a network device having a function of interfacing with said network;

a network quality monitor to monitor a quality of said network, based on at least one of an intensity and a radio bandwidth of a radio wave received by said network device;

a hand-over controller to execute a hand-over operation of transmitting a care of address to an address registering destination in response to a state of said network quality before disconnecting a communication, changing a route of communication information, and switching a connecting destination into a new network; and a network controller to receive a response that indicates an update of said care of address in said address registering destination and to keep a function of receiving data from the previous network before being switched until said communication is disconnected, wherein:

said network quality monitor includes a shortage threshold value for detecting a shortage of said radio bandwidth currently available and a recovery threshold value for detecting a recovery from said shortage of said radio bandwidth, said recovery threshold value being higher than said shortage threshold value;

said hand-over controller performs the hand-over operation accompanied with a lower network quality if said radio bandwidth is lower than said shortage threshold value; and said hand-over controller performs the hand-over operation accompanied with a recovered network if said radio bandwidth is higher than said recovery threshold value.

2. The mobile node according to claim 1, wherein when said network quality monitor recognizes the quality of the network being currently active in communication becomes lower, said hand-over controller switches said connecting destination into a new network.

3. The mobile node according to claim 1, wherein when said network quality monitor recognizes a recovery of the quality of said previous network before being switched, said hand-over controller returns said connecting destination into said previous network before being switched.

4. The mobile node according to claim 1, wherein said hand-over controller stores a priority sequence of connecting networks and hands the current network over to the network in a higher priority sequence according to the change of said network quality.

5. The mobile node according to claim 1, wherein said network quality monitor includes a lowering threshold value for detecting a lower quality of a radio wave and another recovery threshold value for detecting a recovered network quality, and said hand-over controller performs said hand-over operation accompanied with said lower network quality if the quality of the received radio wave is lower than said lowering threshold value or said hand-over operation accompanied with the recovery of said network if the quality of said received radio wave is higher than said another recovery threshold value.

6. The mobile node according to claim 5, wherein said network quality monitor recognizes said network quality becomes lower and outputs a hand-over request if the quality of said received radio wave is continuously lower than said lowering threshold value for a certain length of time or recognizes said network is recovered and outputs a hand-over request if the quality of said received radio wave is continuously higher than said another recovery threshold value for a certain length of time.

7. The mobile node according to claim 1, wherein said network quality monitor includes an abrupt degrade threshold value and recognizes said network quality becomes lower and promptly outputs a hand-over request if the quality of said received radio wave is lower than said abrupt degrade threshold value, and said hand-over controller performs said hand-over operation in response to said hand-over request.

8. The mobile node according to claim 1, wherein said network quality monitor performs at least one of the functions of:

monitoring the network quality at fixed or variable periods; and monitoring the network quality each time a packet receipt is started.

9. The mobile node according to claim 1, wherein when said network controller detects a request for stopping said network device, said hand-over controller performs the hand-over operation before said network device is stopped, while when said network controller detects a request for starting said network device, said hand-over controller performs said hand-over operation after completion of starting said network device.

10. The mobile node according to claim 1, wherein when said network controller detects a request for disconnecting a link with said network used by said network device, said hand-over controller performs the hand-over operation before said link is disconnected, while when said network controller detects a request for connecting with said network device, said hand-over controller performs said hand-over operation after completing the process of connecting with said network device.

11. The mobile node according to claim 1, wherein said network quality monitor manages a network quality index calculated by weighting said network quality and the priority and said hand-over controller performs the hand-over operation based on said network quality index.

12. The mobile node according to claim 1, wherein when said network includes a first access point and a second access point, when said network quality monitor recognizes that the network quality of said first access point being currently active in communication becomes lower and that said mobile node itself may be connected with said second access point based on the network quality of said second access point, said hand-over controller performs the hand-over operation from said first access point to said second access point.

13. A hand-over method of performing a hand-over operation with respect to communications executed on a mobile IP network, comprising:

a mobile node including a plurality of interface network devices mounted therein and is moving among a plurality of networks, monitoring a network quality based on at least one of an intensity and a radio bandwidth of a radio wave received by said network device;

transmitting a care of address to an address registering destination in response to a state of said network quality before a communication is disconnected;

receiving a response that indicates an update of said care of address in said address registering destination and keeping a function of receiving data from a network before being switched until said communication is disconnected; and performing a hand-over operation of changing a route of communication information after said care of address is transmitted and switching a connecting destination into a new network, wherein:

a shortage threshold value for detecting a shortage of said radio bandwidth currently available and a recovery threshold value for detecting a recovery from said shortage of said radio bandwidth are provided, said recovery threshold value being higher than said shortage threshold value;

if said radio bandwidth is lower than said shortage threshold value, said hand-over operation is executed according to a lower network quality; and if said radio bandwidth is higher than said recovery threshold value, said hand-over operation is executed according to a recovered network.

14. The hand-over method according to claim 13, wherein when the lower quality of the network being currently active in communication is recognized, said connecting destination is switched into a new network.

15. The hand-over method according to claim 13, wherein when a recovery of the quality of the previous network before being switched is recognized, said connecting destination is returned into the previous network before being switched.

16. The hand-over method according to claim 13, further comprising storing a priority sequence of connecting networks and handing the current network over to a network located in a higher priority sequence according to the change of said network quality.

17. The hand-over method according to claim 13, wherein a lowering threshold value for detecting a lower quality of a radio wave and another recovery threshold value for detecting a quality recovery are provided and the hand-over operation is executed according to the lower network quality if the quality of a received radio wave is lower than said lowering threshold value or the hand-over operation is executed according to the recovered network if the quality of said received radio wave is higher than said another recovery threshold value.

18. The hand-over method according to claim 17, wherein the lower network quality is recognized and the hand-over operation is executed according to said lower network quality if the quality of said received radio wave is continuously lower than said lowering threshold value for a certain length of time or the recovered network is recognized and the hand-over operation is executed according to the network recovery if the quality of said received radio wave is continuously higher than said another recovery threshold value for a certain length of time.

19. The hand-over method according to claim 13 wherein an abrupt degrade threshold value is provided and if the quality of a received radio wave is lower than said abrupt degrade threshold value, it means that the lower network quality and said hand-over operation is promptly executed.

20. The hand-over method according to claim 13, wherein said network quality performs at least one of the functions of:

monitoring the network quality at fixed or variable periods; and monitoring the network quality each time a packet receipt is started.

21. The hand-over method according to claim 13, wherein in the case of detecting a request for stopping said network device, said hand-over operation is executed before said network device is stopped or, in the case of detecting a request for starting said network device, said hand-over operation is executed after completing the process of starting said network device.

22. The hand-over method according to claim 13, wherein in the case of detecting a request for disconnecting the link with the network being used by said network device, said hand-over operation is executed before said link is disconnected, while in the case of detecting a request for connection of said network device, said hand-over operation is executed after completing the connection of said network device.

23. The hand-over method according to claim 13, wherein said hand-over operation is executed based on a network quality index calculated by weighting the network quality and a priority.

24. The hand-over method according to claim 13, wherein when the network includes a first and a second access points located thereon, if the lower network quality of said first access point being currently active in communication is recognized and the connection with said second access point is determined on the network quality of said second access point, the hand-over operation is executed from said first access point to said second access point.

25. A mobile IP system for performing communications on a mobile IP network, comprising:
- a network device having a function of interfacing with networks;
- a mobile node having a network quality monitor to monitor a network quality based on at least one of an intensity and a radio bandwidth of a radio wave received by each of said network devices, a hand-over controller to perform a hand-over operation of transmitting a care of address to an address registering destination in response to a state of said network quality before a communication is disconnected, changing a route of communication information and switching a connecting destination into a new first network, and a network controller to receive a response that indicates an update of said care of address in said address registering destination and to keep a function of receiving data from a previous second network before being switched until said communication is disconnected;
- a home agent to receive said care of address and to recognize distribution and location of information destined for said mobile node; and
- a correspondent node being connected with a default router to receive said care of address and to transmit information through said second network until said communication is disconnected and communication data with said mobile node through said first network after said hand-over process, wherein:
- said network quality monitor includes a shortage threshold value determiner for detecting a shortage of said radio bandwidth currently available and a recovery threshold value for detecting a recovery from said shortage of said radio bandwidth, said recovery threshold value being higher than said shortage threshold value;
- said hand-over controller performs the hand-over operation accompanied with a lower network quality if said radio bandwidth is lower than said shortage threshold value; and
- said hand-over controller performs the hand-over operation accompanied with a recovered network if said radio bandwidth is higher than said recovery threshold value.

26. A mobile node for communication data on a mobile IP network, comprising:
- a network device having a function of interfacing with a plurality of different mobile IP networks;
- a network quality monitor to monitor each quality of said plurality of mobile IP networks, based on at least one of an intensity and a radio bandwidth of a radio wave received by said network device; and
- a hand-over controller to execute a hand-over operation of switching the mobile IP network being currently active in communication into another mobile IP network in response to a state of said each quality of said plurality of mobile IP networks, wherein:
- said network quality monitor includes a shortage threshold value determiner for detecting a shortage of said radio bandwidth currently available and a recovery threshold value for detecting a recovery from said shortage of said radio bandwidth, said recovery threshold value being higher than said shortage threshold value;
- said hand-over controller performs the hand-over operation accompanied with a lower network quality if said radio bandwidth is lower than said shortage threshold value; and
- said hand-over controller performs the hand-over operation accompanied with a recovered network if said radio bandwidth is higher than said recovery threshold value.

* * * * *